United States Patent [19]

Sorimachi et al.

[11] Patent Number: 5,031,949
[45] Date of Patent: Jul. 16, 1991

[54] APPARATUS FOR OPENING AND CLOSING ROOF OF OPEN ROOF CAR

[75] Inventors: Toshihiro Sorimachi; Kotaro Shige; Fumio Furuki; Fumio Kobayashi; Takaji Mukumoto; Hirobumi Morita, all of Wako, Japan

[73] Assignee: Honda Giken Kogyo Kabushiki Kaisha, Tokyo, Japan

[21] Appl. No.: 569,036

[22] Filed: Aug. 17, 1990

[30] Foreign Application Priority Data

Aug. 18, 1989 [JP] Japan .................................. 1-211470
Jul. 16, 1990 [JP] Japan ................................ 2-74305[U]
Jul. 16, 1990 [JP] Japan ................................ 2-74306[U]

[51] Int. Cl.$^5$ ........................ B60J 7/047; B62D 25/10
[52] U.S. Cl. ..................................... 296/76; 296/99.1; 296/107; 296/216; 296/218; 296/222; 296/223; 296/224
[58] Field of Search ................ 296/76, 107, 99.1, 216, 296/218, 222-224

[56] References Cited

U.S. PATENT DOCUMENTS 1,474,283 11/1923 Nystrom et al. ..................... 296/107
2,772,917 12/1956 Goldman ............................. 296/222
2,782,070 2/1957 Chaban ............................... 296/107
3,233,936 2/1966 Jakosky ................................ 296/76

FOREIGN PATENT DOCUMENTS 0101322 2/1984 European Pat. Off. ............ 296/222
0198517 9/1987 Japan .................................. 296/107

Primary Examiner—Dennis H. Pedder
Attorney, Agent, or Firm—Armstrong, Nikaido, Marmelstein, Kubovcik & Murray

[57] ABSTRACT

A roof is opened and closed by utilizing a trunk lid for opening and closing a trunk room. The trunk lid can be raised and lowered while it is held substantially horizontal. The trunk lid is provided with a roof slide unit for moving the roof in longitudinal directions.

When opening the roof in a closed state, the trunk lid is raised to a position behind the roof, and the roof is moved rearwardly by the roof slide unit to be supported by the trunk lid. Then, the trunk lid is lowered down to a position to close the trunk room. This brings an end to an operation of opening the roof. A reverse procedure may be taken for closing the roof.

12 Claims, 18 Drawing Sheets

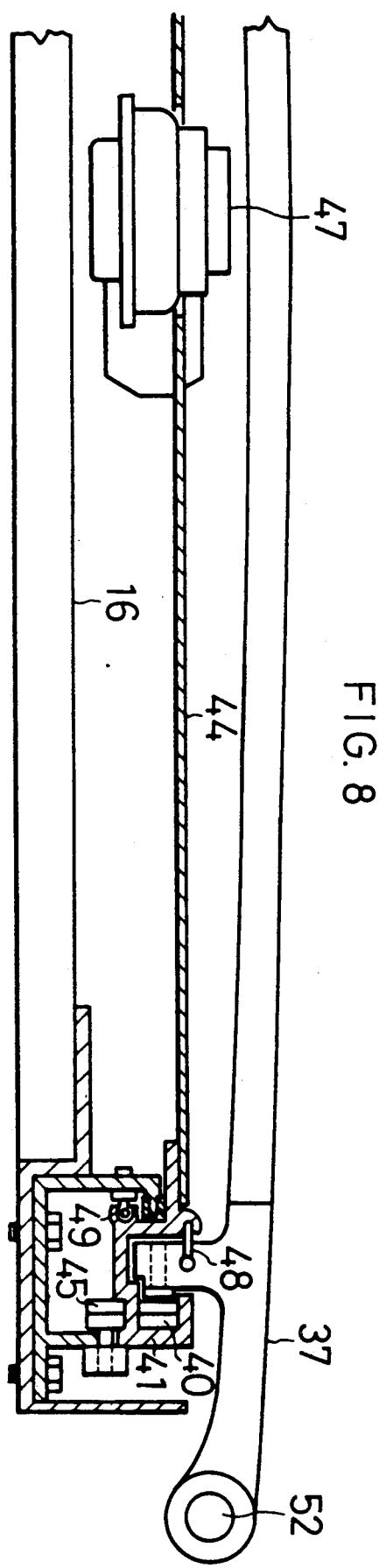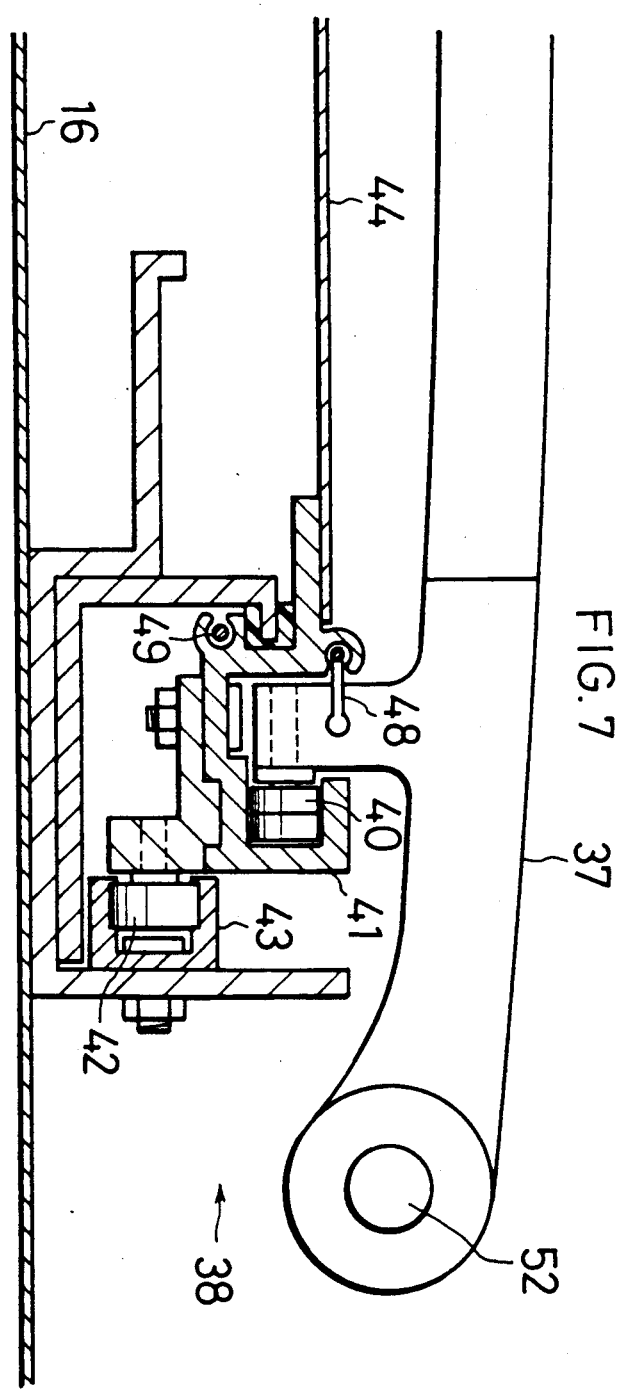

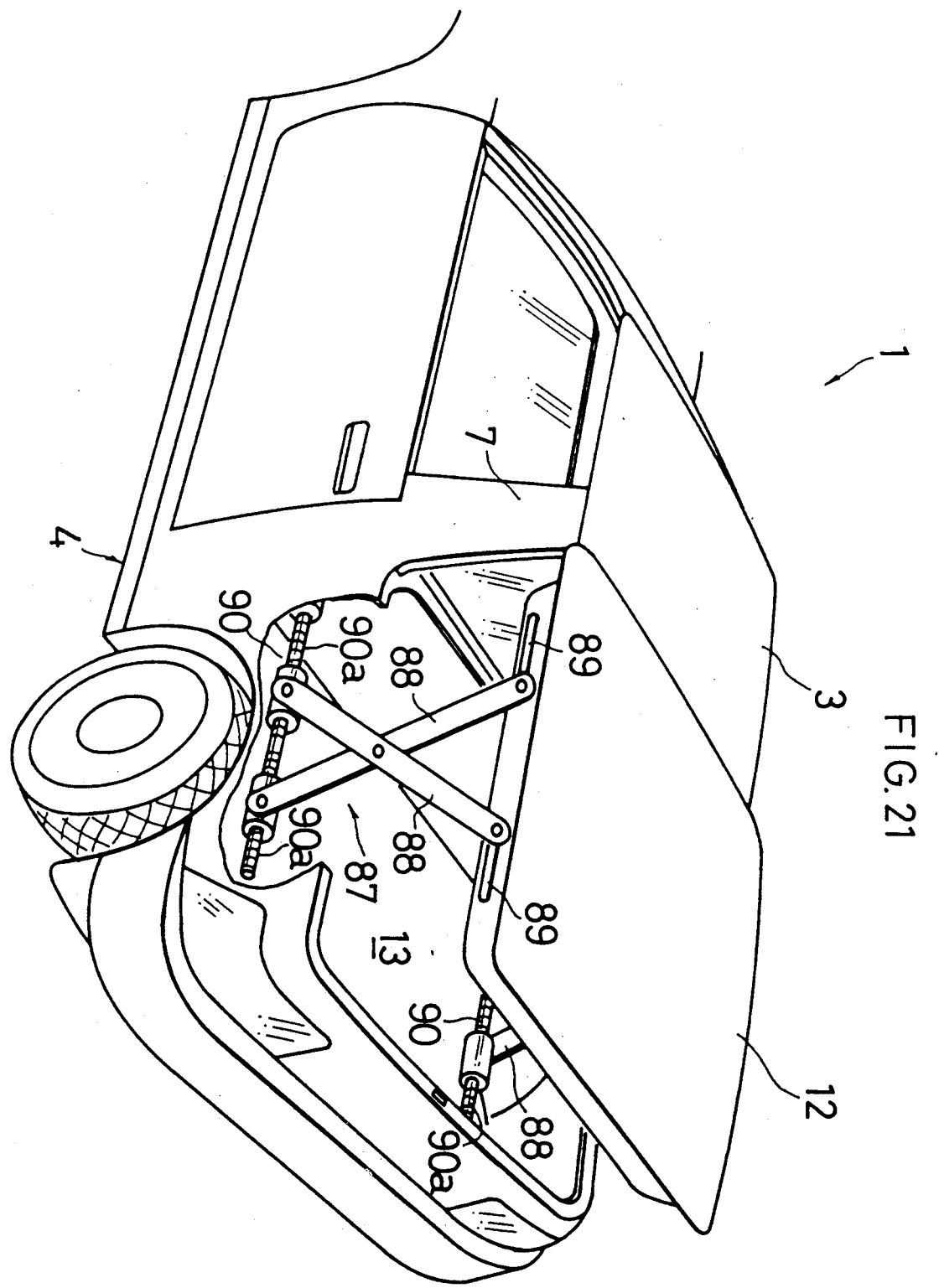

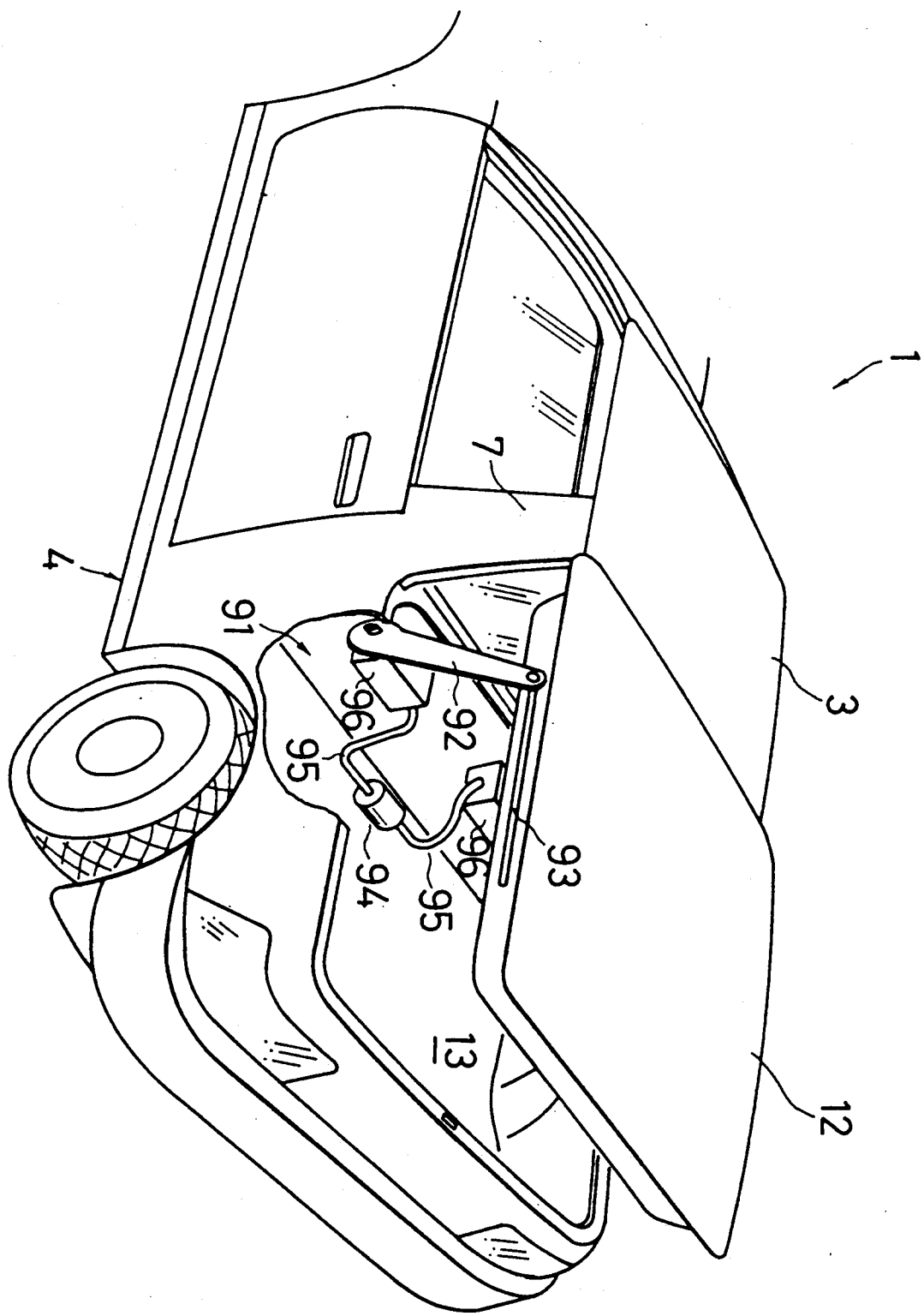

APPARATUS FOR OPENING AND CLOSING ROOF OF OPEN ROOF CAR

BACKGROUND OF THE INVENTION

This invention relates to an open roof car, in which a roof above a car room is removable, and more particularly, to a roof opening/closing apparatus for opening and closing the roof.

It is conceivable to let a roof atop a car room of a car be opened and closed to provide an open sense suited when it is fine. As typical open roof car, there are known a convertible car, which has a roof in a form of a foldable top and a car having a roof, which is partly a sun roof capable of being opened and closed.

In the case of a convertible car, however, such operation as covering the car top with a cover when opening the roof lest the appearance of the car should be spoiled by the folded top is required, and therefore it is rather cumbersome to open and close the roof. Further, in its closed state, the roof can not share the rigidity of the car body. For the durability of the car body, therefore, it is necessary to efficiently increase the rigidity of a lower portion of the car body, and this increases the weight of the car body. In the case of a sun roof, only a portion of the roof is opened, and sufficient sense of opening can not be obtained.

Accordingly, there have been proposed a removable roof car, in which a roof atop a car room can be mounted on and dismounted from a car body, as disclosed in, for instance, Japanese Patent Publication No. 46-14366. In this case, the roof, when opened, is removed from the car body and accommodated in a trunk room or the like.

Heretofore, in such removable roof car the roof is manually mounted and dismounted for closing and opening.

However, since the roof is large in size, the operation of opening or closing the roof by manually removing the roof and accommodating it or taking it out of an accommodation space and mounting it on the car body is very cumbersome and requires considerable time.

Even in such an open roof car, in which the whole roof is mounted and dismounted, it is desired that the roof can be automatically opened and closed and accommodated in the car body when opened as in a case of a motor-driven sun roof.

To realize this, it is conceivable to provide a movable roof which is made integral with rear pillars and rotatably support the lower ends of the rear pillars on the car body. With this arrangement, it is possible to let the roof and rear pillars be accommodated in a trunk room by rearwardly turning them, and thus the operation of opening and closing the roof can be readily automated.

In this case, however, the free end of the roof draws a semi-circular orbit having a large radius when the roof is opened and closed. This means that it is impossible to open and close the roof in a place with a low ceiling such as a garage.

SUMMARY OF THE INVENTION

The present invention has been intended in the light of the above, and it has an object of providing an apparatus for opening and closing a roof in an open roof car, in which the roof can be mounted and dismounted, which apparatus permits the roof to be readily opened and closed even in a narrow space such as a garage.

Another object of the invention is to provide a roof opening/closing apparatus which permits automatic opening and closing of a roof.

A further object of the invention is to permit a satisfactory appearance to be maintained, in either case when the roof is open or closed.

To attain these objects of the invention, it is adopted to let a trunk lid be raised and lowered for opening and closing a trunk room while it is held substantially in a horizontal state, and a roof slide unit is provided, which causes movement of the roof in longitudinal directions.

With this construction, by raising and lowering the trunk lid up to a position behind the roof in a closed position and then rearwardly moving the roof with the roof slide unit, the roof is supported on the trunk lid. Then, the trunk lid is lowered to a position to close the trunk room. Thus, the roof is opened and held in a state supported by the trunk lid.

The roof may be closed by taking the reverse procedure.

Generally, when such roof is in its closed position, its front end is supported in a sealing fashion by a front cross member provided between the upper ends of front pillars, and its rear end is supported in a sealing relation on a roll bar provided in a rear portion of the car room. Therefore, if the roof is moved rearwardly, damage to the seal is prone. To prevent this, it is desirable to provide a roof lift unit, which can raise and lower the whole roof or at least the rear end thereof. In this case, the roof is first raised and then moved rearwardly.

The trunk lid may be hollow and open at the front end so that an inner roof accommodation space is defined. With this construction, the roof, when moved rearwardly, is accommodated in the trunk lid, and therefore, the appearance of the car is never spoiled by the removed roof. In this case, the bottom of the roof accommodation space is desirably provided with a drain port to prevent collection of water when the accommodated roof is wet. The drain port is adapted to be opened when the trunk lid is at a position to close the trunk room.

A trunk lid driver unit for raising and lowering the trunk lid may consist of a feed screw mechanism. In this case, the car body is provided with feed screws extending in vertical direction, while trunk lid support gets are provided with nut members meshing with the feed screws. The feed screws are rotated by a drive unit including a motor.

Further, the trunk lid deiver unit is desirably provided with a motor-driven stopper for holding it stationary so that the trunk lid can be held in the raised position. The stopper can be released manually as well. In a preferred embodiment of the invention, the roof slide unit consists of roof drive pins movable longitudinally by a motor-driven drive unit and guides for guiding longitudinal movement of the roof drive pins. The roof has its rear end provided with engagement bores, into which the roof drive pins are inserted forwardly.

Each guide includes a first guide rail for supporting each roof drive pin for movement in longitudinal direction and a second guide rail for supporting the first guide rail for movement in longitudinal directions. The rear end of the first guide rail is provided with a rear portion support member which is supported by the second guide rail. The trunk lid is provided with a front portion support member for supporting the first guide rail at a position thereof near the front end when the first guide rail is at an advanced position and an intermediate support member for supporting the front end of the first guide rail when the first guide rail is at a retracted position.

With this arrangement, the roof drive pins can be greatly projected forwardly from the trunk lid. Thus, they can be readily coupled to the roof even if the raised trunk lid is rearwardly spaced apart from the roof in the closed position. Further, the first guide rail is supported at two points at all time, and thus the roof can be supported stably.

When the rear end of the roof is provided with engagement bores, it is desirable to let the rear end be conceived from the rear by the roll bar to provide satisfactory appearance when the roof is in the closed position. In this case, the engagement bores may be exposed rearwardly with the rear end of the roof pushed up by a tilting-up unit provided on the roll bar. It is possible that the tilting-up unit also serves as roof lift unit noted above.

BRIEF DESCRIPTION OF THE DRAWINGS

FIG. 7 is a sectional view, to an enlarged scale, taken along line VII—VII in FIG. 6;

FIG. 8 is a sectional view taken along line VIII—VIII in FIG. 4;

FIG. 21 is a perspective view showing a further embodiment of the invention; and FIG. 22 is a perspective view showing a still further embodiment of the invention.

DETAILED DESCRIPTION OF THE PREFERRED EMBODIMENTS

Figure 1:
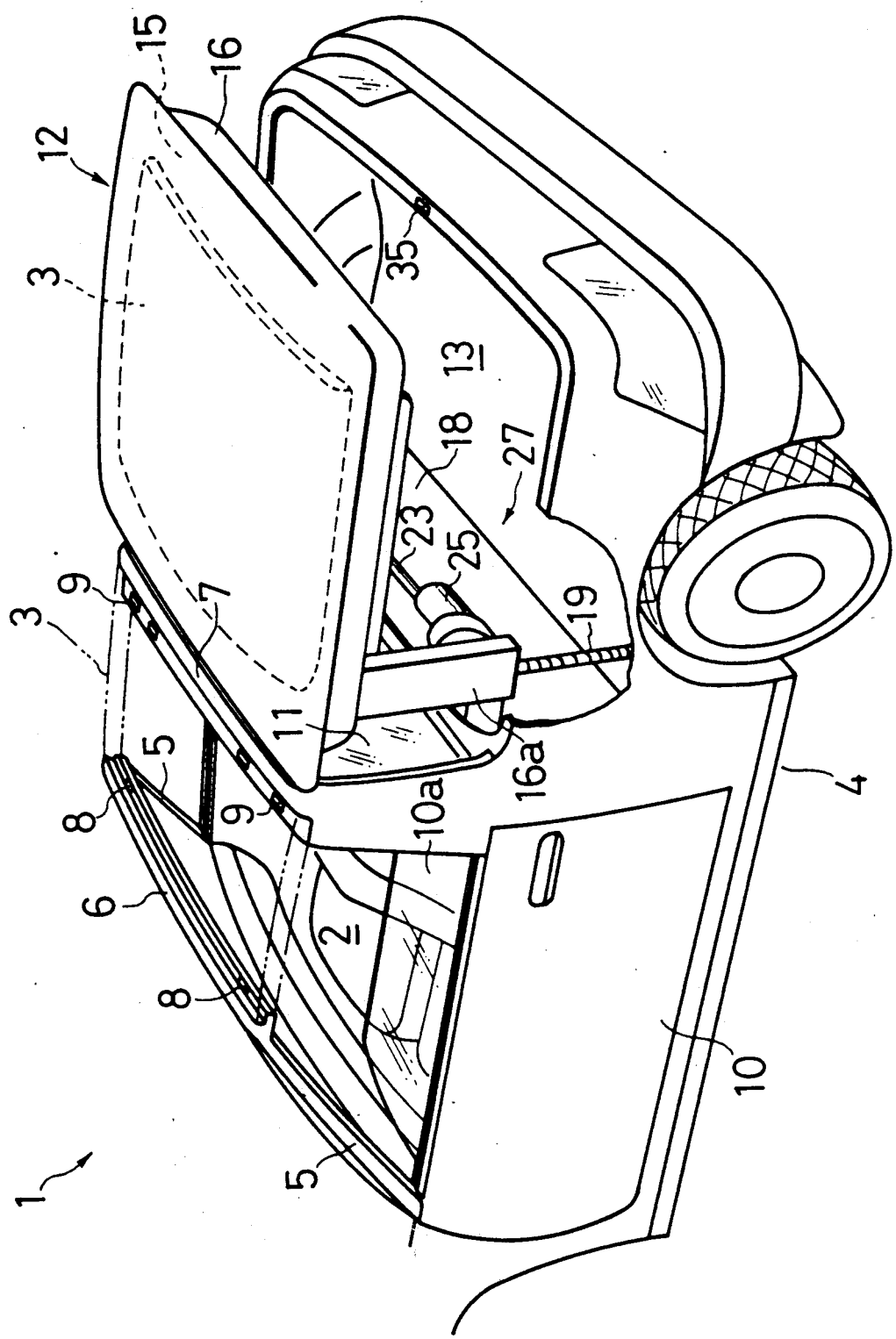
FIG. 1 is a schematic perspective view showing an essential part of an open roof car incorporating an embodiment of the apparatus for opening and closing roof according to the invention.

Referring to FIG. 1, there is shown open roof car 1, roof 3 of which can cover the top of car room 2 and is removable from car body 4. As shown by phantom lines, roof 3 is secured to car body 4 with its front edge portion supported by front crossbeam member 6 connecting the upper ends of front pillars 5 and with its rear edge portion supported by gate-shaped roll bar 7 provided on a rear portion of car room 3, and it is adapted to close the top of car room 2. In order that roof 3 is sealed to car body 4 in its closed position, front crossbeam member 6 and roll bar 7 are provided with active lock devices 8 and 9 motor-driven for locking and unlocking to withdraw striker or rotate latch so as to being roof 3 into forced contact with car body 4 for improving the seal property.

In this way, roof 3 can be mounted on and dismounted from car body 4, and the top of car room 2 is opened by removing roof 3. The car has doors 10 which are sashless doors. By lowering glasses 10a, an upper space of car room 2 is increased sidewise to provide a sense of wide opening. Door glasses 10a can be raised and lowered by a motor-driven window drive unit (not shown). Rear window glass 11 is mounted on roll bar 7. Rear window glass 11, although not shown, can be raised and lowered by a motor-driven window glass drive.

Figure 2:
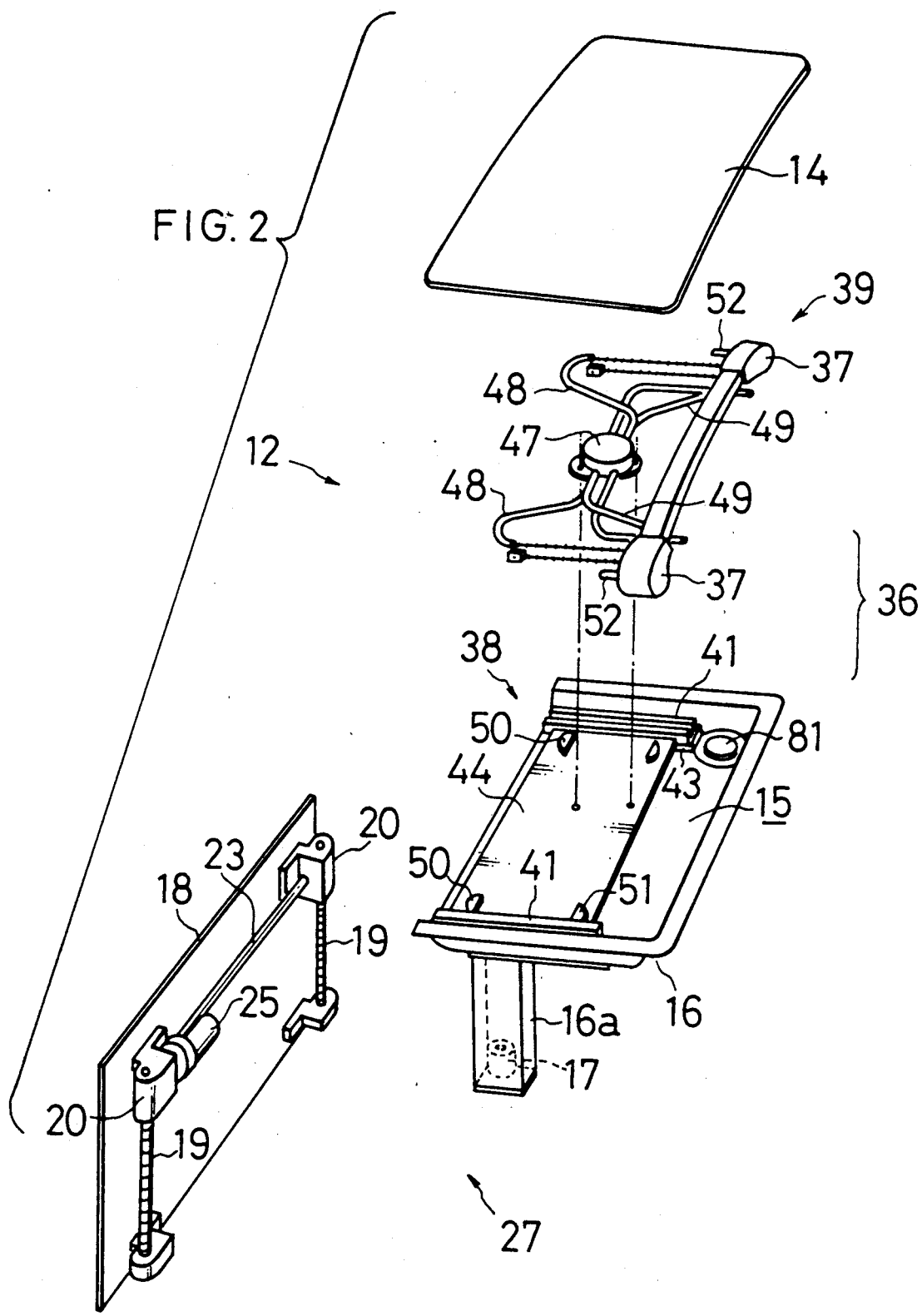
FIG. 2 is an exploded perspective view showing the same roof opening/closing apparatus.
Figure 3:
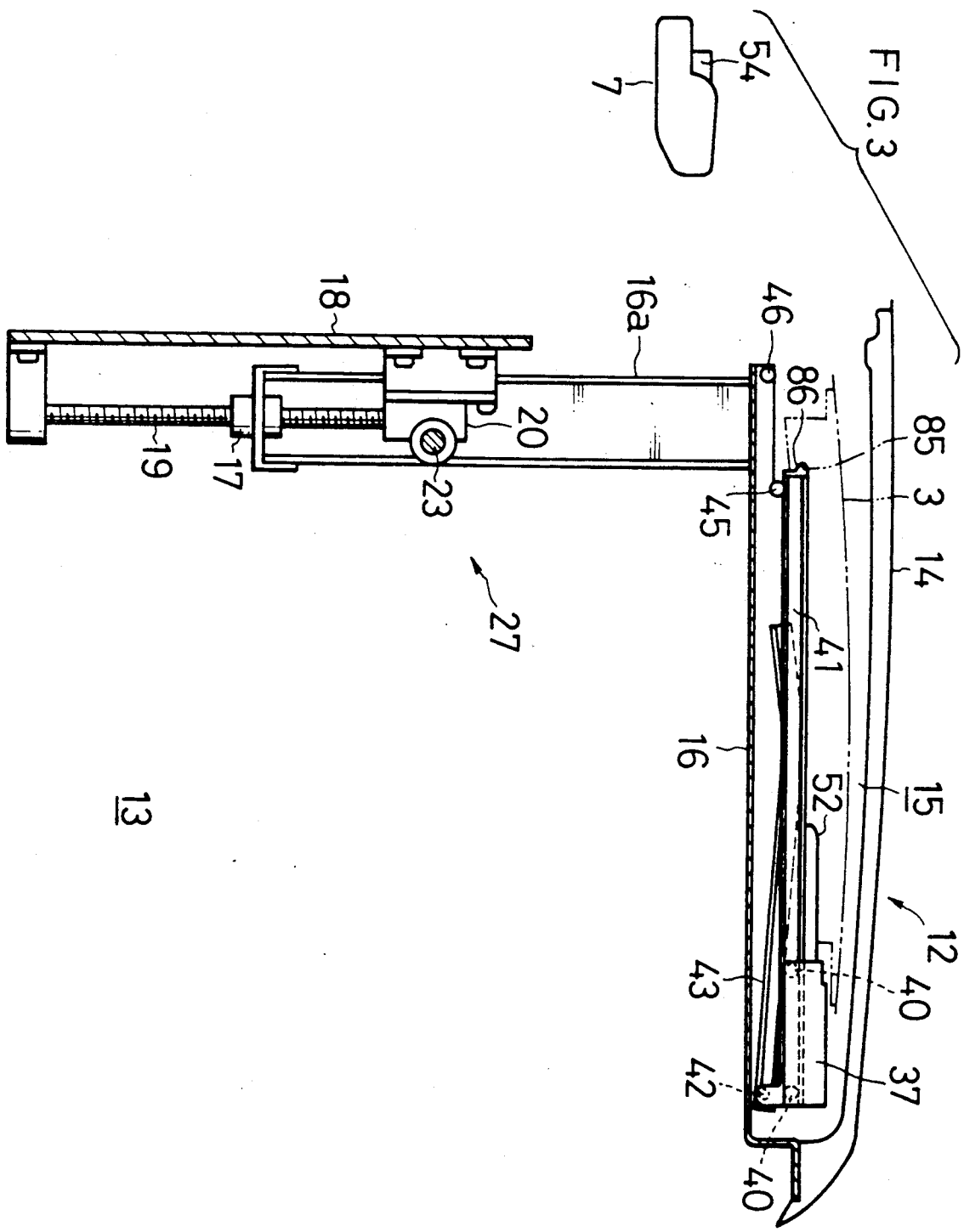
FIG. 3 is a sectional view showing the same roof opening/closing apparatus.

Rearwardly of car room 2 trunk room 13 is provided such that its top is opened and closed by trunk lid 12. Trunk lid 12, as shown in FIGS. 2 and 3, consists of trunk lid panel 14 and trunk lid frame 16 which is bonded to the lower surface of panel 14 and defining roof accommodation space 15 therewith which is open at the front. Roof accommodation space 15 has a size such that it can completely accommodate roof 3 when the roof is moved rearwardly.

Trunk lid frame 16 has a pair of support legs 16a extending downwardly from opposite sides of its front edge. The lower end of each support leg 16a is provided with nut member 17. The front end of trunk room 13 is constituted by bulkhead 18, which supports a pair of rotatable feed screws 19 provided on the opposite sides of its rear surface. Feed screws 19 extend vertically and parallel to each other. Each nut member 17 mounted on each trunk lid support leg 16a is meshed with feed screw 19. Feed screws 19 provided on the side of car body 4 and nut members 17 provided on the side of trunk lid 12 meshing with feed screws 19 constitute a feed screw mechanism, and trunk lid 12 is raised and lowered by the feed screw mechanism while it is held substantially in a horizontal state.

Figure 4:
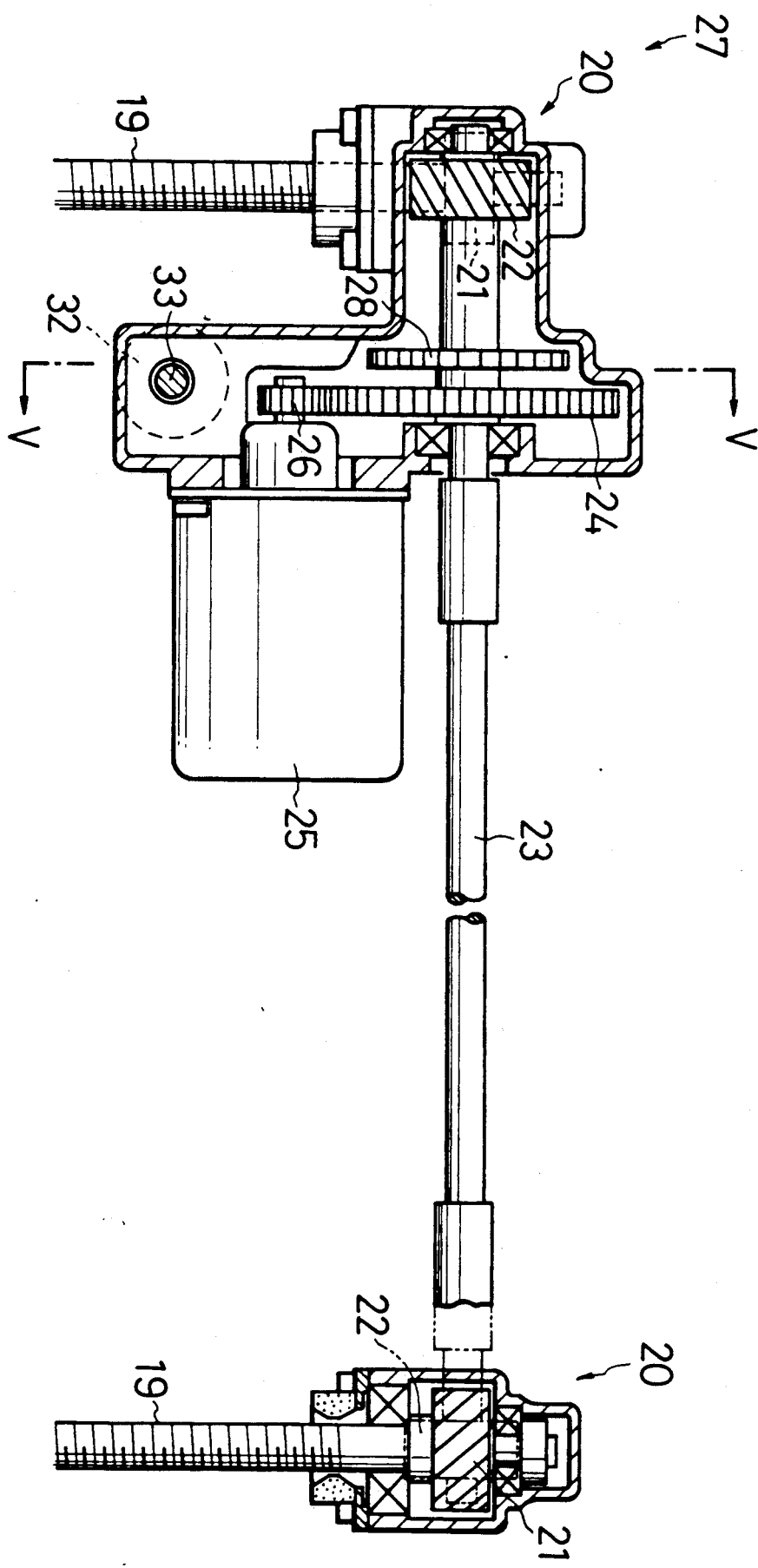
FIG. 4 is a sectional view showing an essential part of a trunk lid driver unit in the same rood opening/closing apparatus.

The upper ends of feed screws 19 are provided with respective gear boxes 20. As shown in FIG. 4, each gear box 20 accommodates driven helical gear 21 screwed to the top of each feed screw 19 and driven helical gear 22 extending at right angles to and meshing with helical gear 21. Driven helical gears 22 are secured to the opposite ends of synchronous transversal shaft 23.

To synchronous shaft 23 is secured driven gear 24, which is a large spur gear. Driven gear 24 is in mesh with drive gear 26, which is a small spur gear secured to an output shaft of motor 23. The rotation of motor 25 is thus reduced in speed by gears 24 and 26 before it is transmitted to synchronous shaft 23. The speed reduction ratio is set to be comparatively low.

Feed screws 19 can be driven simultaneously for rotation in like direction via gear boxes 20 which are coupled to each other and drive unit consisting of motor 25 and so forth for driving the mechanism consistute motor-driven trunk lid drive unit 27. Synchronous shaft 23 of trunk lid drive unit 27 can be driven manually as well by manual means (not shown).

Figure 5:
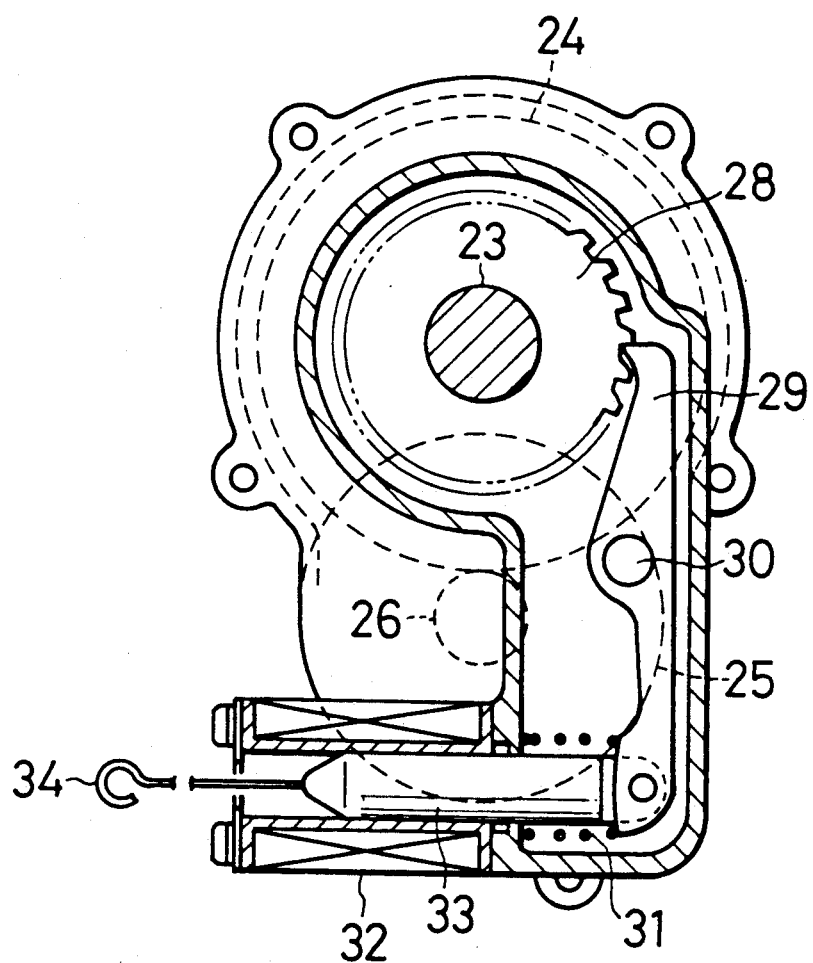
FIG. 5 is a sectional view taken along line V—V in FIG. 4.

As shown in FIGS. 4 and 5, ratchet wheel 28 is further secured to synchronous shaft 3 of trunk lid drive unit 27. Ratchet wheel 28 is regulated by ratchet 29 in mesh with it for rotation downwardly of trunk lid 12, i.e., in the clockwise direction in FIG. 5. Ratchet 29 is supported for swinging about support pin 30 extending parallel to the axis of ratchet wheel 28, and it is biased by return spring 31 to be in mesh with ratchet wheel 28 normally. The other end of ratchet 29 is provided with rod 33 which is operable by solenoid 32. When solenoid 32 is activated, rod 33 is pulled in to cause swinging of ratchet 29 against return spring 31, thus causing ratchet 29 to be detached from ratchet wheel 28. To rod 33 is coupled wire 34, which can cause swinging of ratchet 29 when it is pulled with a hand.

Ratchet 29 can be released from the mesh with ratchet wheel 28 either automatically or manually. When ratchet 29 is in mesh with ratchet wheel 28, the operation of trunk lid drive unit 27 in the downward direction with respect to the front lid 12 is restricted. Ratchet wheel 28, ratchet 29 and solenoid 32 constitute a motor-driven stopper for holding unit 27 stationary. Further, wire 34 constitutes manual releasing means for manually releasing the stopper.

As shown in FIG. 3, when trunk lid 12 is raised to its uppermost position, it is slightly higher in level than roll bar 7 and is cloated and spaced apart rearwardly therefrom. When it is lowered to the lowermost position, the top of trunk room 13 is perfectly closed. In order that trunk lid 12 is locked in its position, at which the trunk room 13 is closed, the top of the rear end of car body 4 is provided with active lock unit 35 (FIG. 1).

Figure 6:
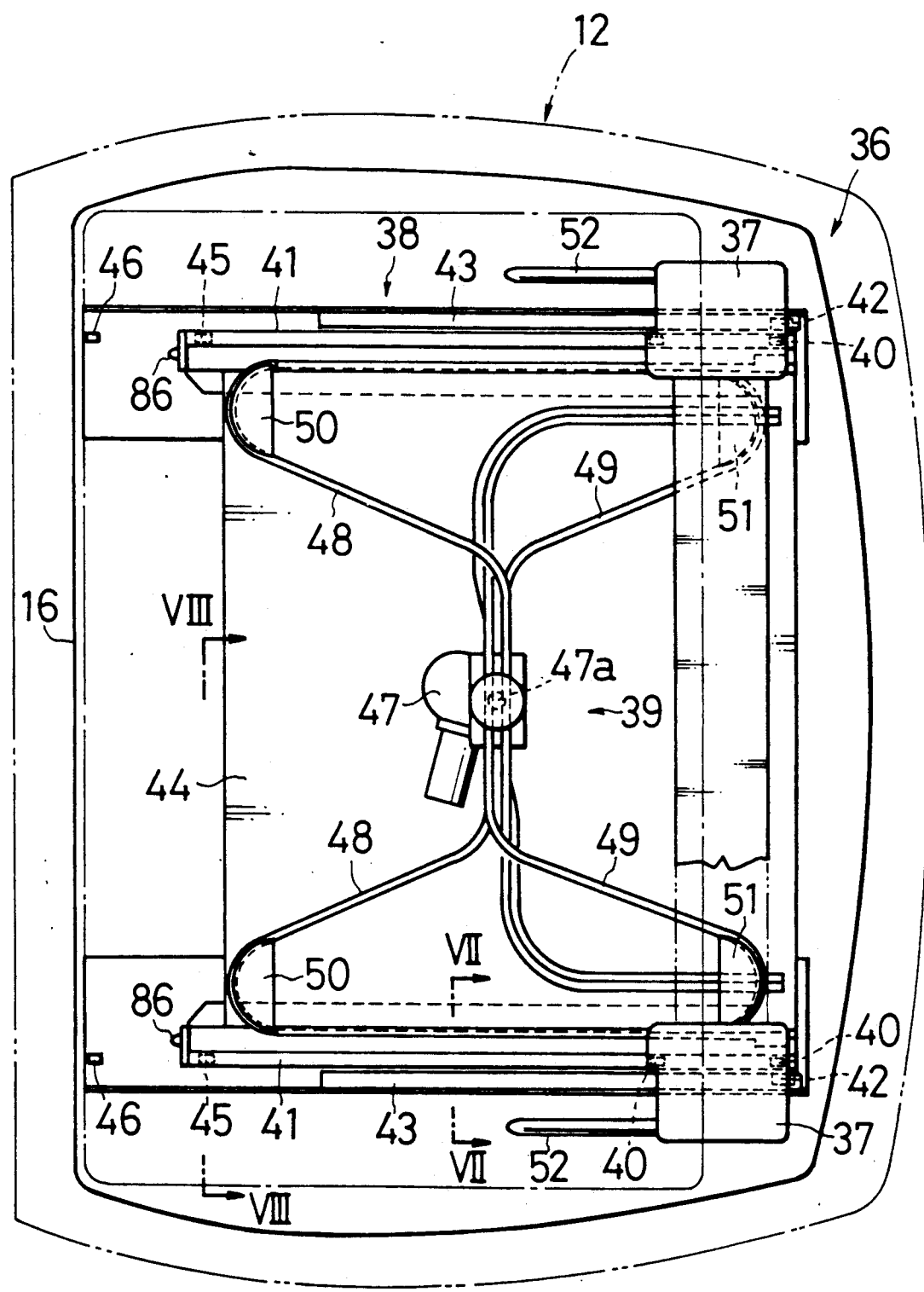
FIG. 6 is a plan view showing a rood slide unit in the roof opening/closing apparatus.

As is obvious from FIGS. 2 and 6, trunk lid 12 is provided with motor-driven rod slide unit 36. Roof slide unit 36 includes trunk lid frame 16, a pair of sliders 37, guides 38 for guiding sliders 37 in forward and backward directions, and drive mechanism 39 for driving sliders 37 and guides 38. Paired sliders 37 are made integral and moved in unison with each other.

Figure 9:
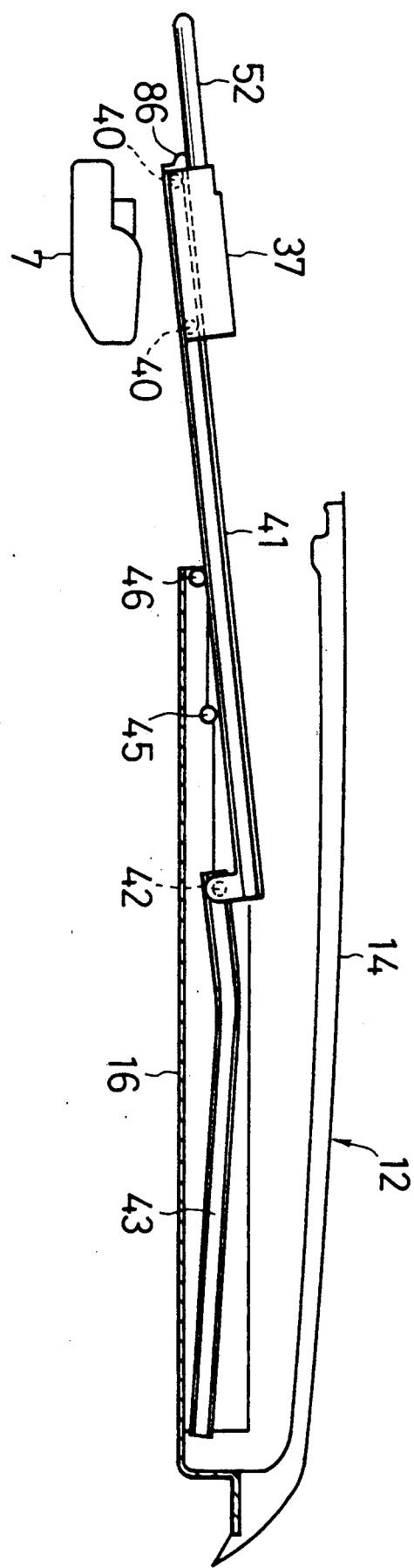
FIG. 9 is a sectional view similar to FIG. 3 but showing a state when roof drive pins are fully advanced by the roof slide unit.

As is clearly shown in FIGS. 6 to 9, paired guides 38 respectively include first guide rails 41, which rollers 40 provided on sliders 37 roll along, and second guide rails 43, which rear support rollers 42 provided on first guide rails 41 at the rear end thereof roll along. Paired first guide rails 41 are coupled to each other by connecting member 44 and movable in unison with each other along second guide rails 43. Each second guide rail 43 has a channel-like sectional profile and is open inwardly. It is secured to each side of trunk lid frame 16, and it has a comparatively small length and extends from the rear end of trunk lid frame 16 to a position slightly to the front side from the longitudinal midway between the front and rear ends of trunk lid frame 16. As shown in FIGS. 3 and 9, each second guide rail 43 is upwardly inclined from its rear end and is inclined slightly downwardly from a position near the front end.

Each first guide rail 41 has a greater length than second guide rail 43. As shown in FIG. 3, when it is fully retreated position, its front end is located at a position close to the front end of trunk lid frame 16. Trunk Lid frame 16 is provided with intermediate support rollers 45 for supporting the front end of first guide rails 41 in the state noted above. Intermediate support rollers 43 support first guide rails 41 substantially in a horizontal state at the fully retreated position. Trunk lid frame 16 is further provided with locking members (not shown) for engaging with the front end of first guide rails 41 and restricting upward movement thereof in the fully retreated state thereof.

It will be seen that first guide rails 41 are supported by second guide rails 43 for movement in forward and backward directions, while sliders 37 are supported by first guide rails 41 for movement in forward and backward directions. Sliders 37 are thus movable in forward and backward directions by a distance substantially equal to the sum of the lengths of first and second guide rails 41 and 43. When first guide rails 41 are moved to their fully engaged position, as shown in FIG. 9, their front end portions greatly project from the front end of trunk lid frame 16 and reach a position above roll bar 7. Trunk lid frame 16 is provided adjacent to front end with front position support rollers 46 for supporting first guide rails 41 at their position close to the fully advanced position. Front position support rollers 46 are provided at a position lower than the front end of second guide rails 43. Thus, when first guide rollers 41 are in their advanced position, they are supported by a forwardly downwardly inclined state. In this state, first guide rails 41 are separated from intermediate support rollers 45.

Drive mechanism 39 for roof slide unit 36 can move sliders 37 and first guide rails 41 in forward and backward directions. As is clearly shown in FIG. 6, drive mechanism 39 includes cable drive unit 47 having a motor and paired first and second cables 48 and 49 driven in the length direction by cable drive unit 47. Cable drive unit 47 is provided on a central portion of connecting plate 44 connecting first guide rails 41. Thus, first guide rails 41 are moved along with cable drive unit 47.

Left and right first and second cables 48 and 49 mesh on like side with gear 47a of cable drive unit 47. Thus, when gear 47a is pulled in the clockwise direction in FIG. 6, cables 48 and 49 are all pulled. First cables 48 are folded rearwardly around guides 50 provided on connecting plate 44 adjacent to the front end thereof and then inserted through longitudinal guide bores provided in upper portion of first guide rails 41 for being supported slidably. Their rear ends are secured to respective sliders 37. Second cables 49 are folded forwardly around guides 51 provided on connecting plate 44 adjacent to the rear end thereof and then inserted through longitudinal guide bores provided in a lower portion of first guide rails 41 for being thereby supported slidably. Their front ends are secured to the front end of trunk lid frame 16. Other ends of first and second cables 48 and 49 are free ends.

When gear 47a is rotated in the clockwise direction in FIG. 6 by driving the motor of cable drive unit 47, forwardly, slider 37 is pulled by first cables 48 and moved forwardly along first guide rails 41. At the same time, the connecting plate 44 carrying cable drive unit 47, i.e., first guide rails 41, is given a forward force by second cables 49 secured to trunk lid frame 16 and is moved forwardly along second guide rails 43. When gear 47a is rotated in the counterclockwise direction, on the other hand, both sliders 37 and first guide rails 41 are moved together rearwardly.

In order to be able to energize cable drive unit 47 and the like even when trunk lid 12 is in its raised position, a curled cord or like winding is provided between trunk lid 12 and car body 4.

Each slider 37 has forwardly projecting roof drive pin 52. On the other hand, as shown in FIGS. 10 and 11, the rear end of roof 3 is provided adjacent to each side thereof with engagement bores 53 open to the rear end such that each roof drive pin 52 can be forwardly inserted into bore 53.

The front top of roll bar 7 has stepped lower level support portion 7a, on which the rear end of roof 3 is supported. Thus, when roof 3 is in the closed position, the rear end surface of roof 3 is conceilved by the rear portion of roll bar 7 so that engagement bores 53 are not rearwardly exposed.

Figure 10:
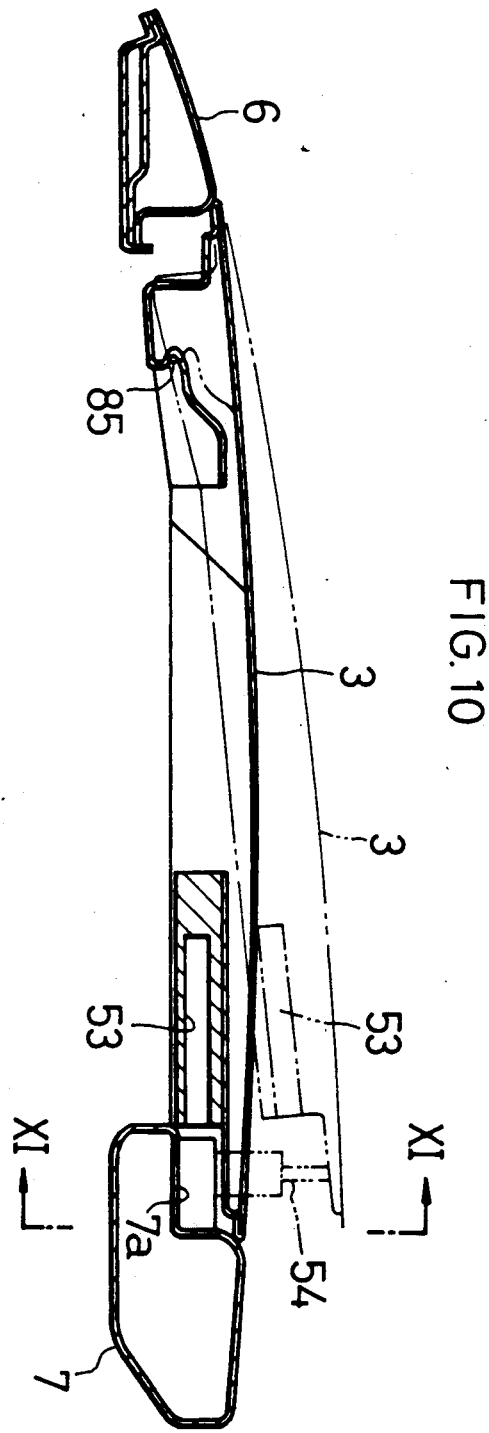
FIG. 10 is a sectional view showing a state with the roof in a closed position.
Figure 11:
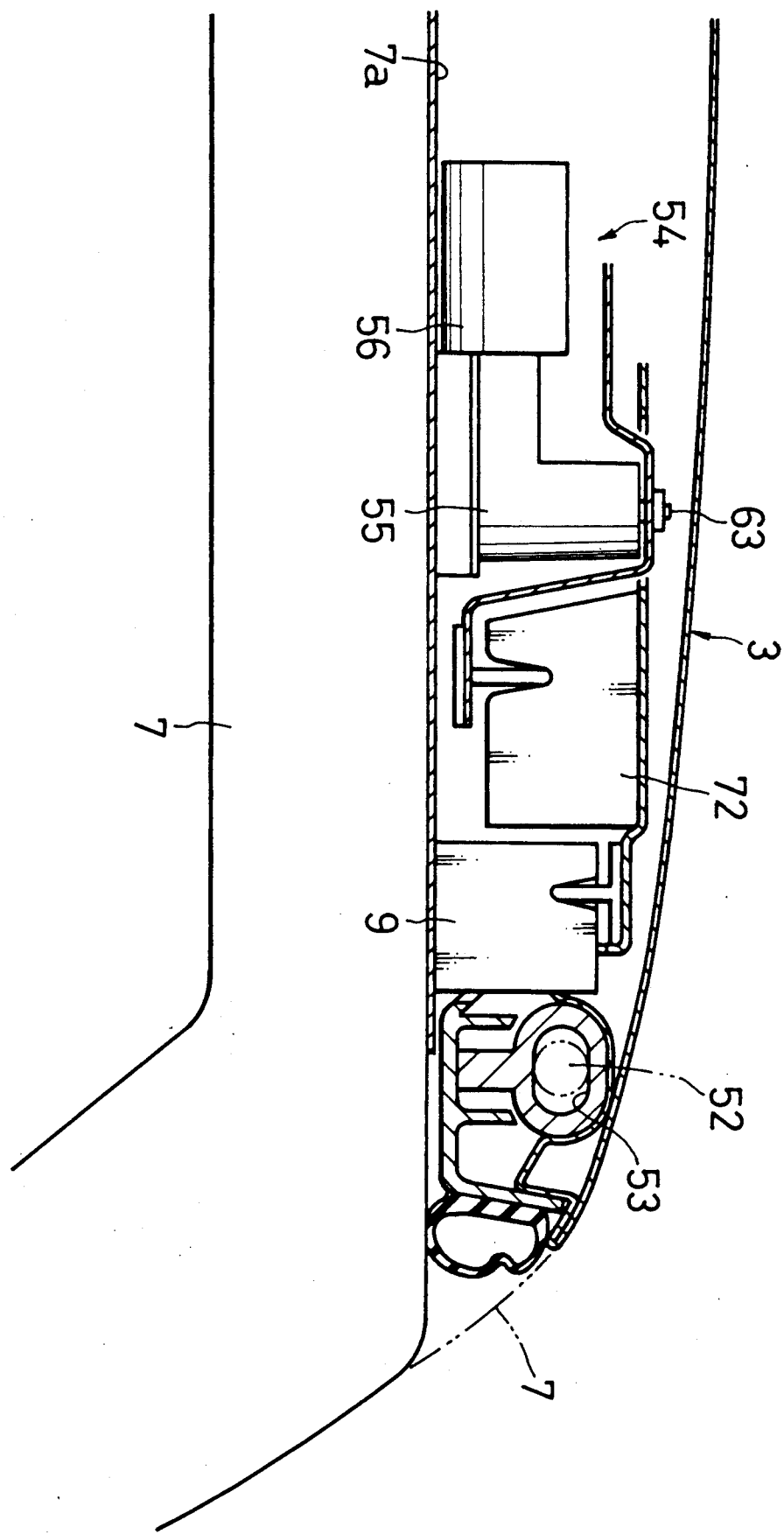
FIG. 11 is a sectional view of the roof taken along line XI—XI in FIG. 10.

Support portion 7a of roll bar 7 is provided on each side thereof with motor-driven tilting-up unit 54 for pushing up and tilting roof 3 in the closing position into a state as shown by phantom lines in FIG. 10.

Figure 13:
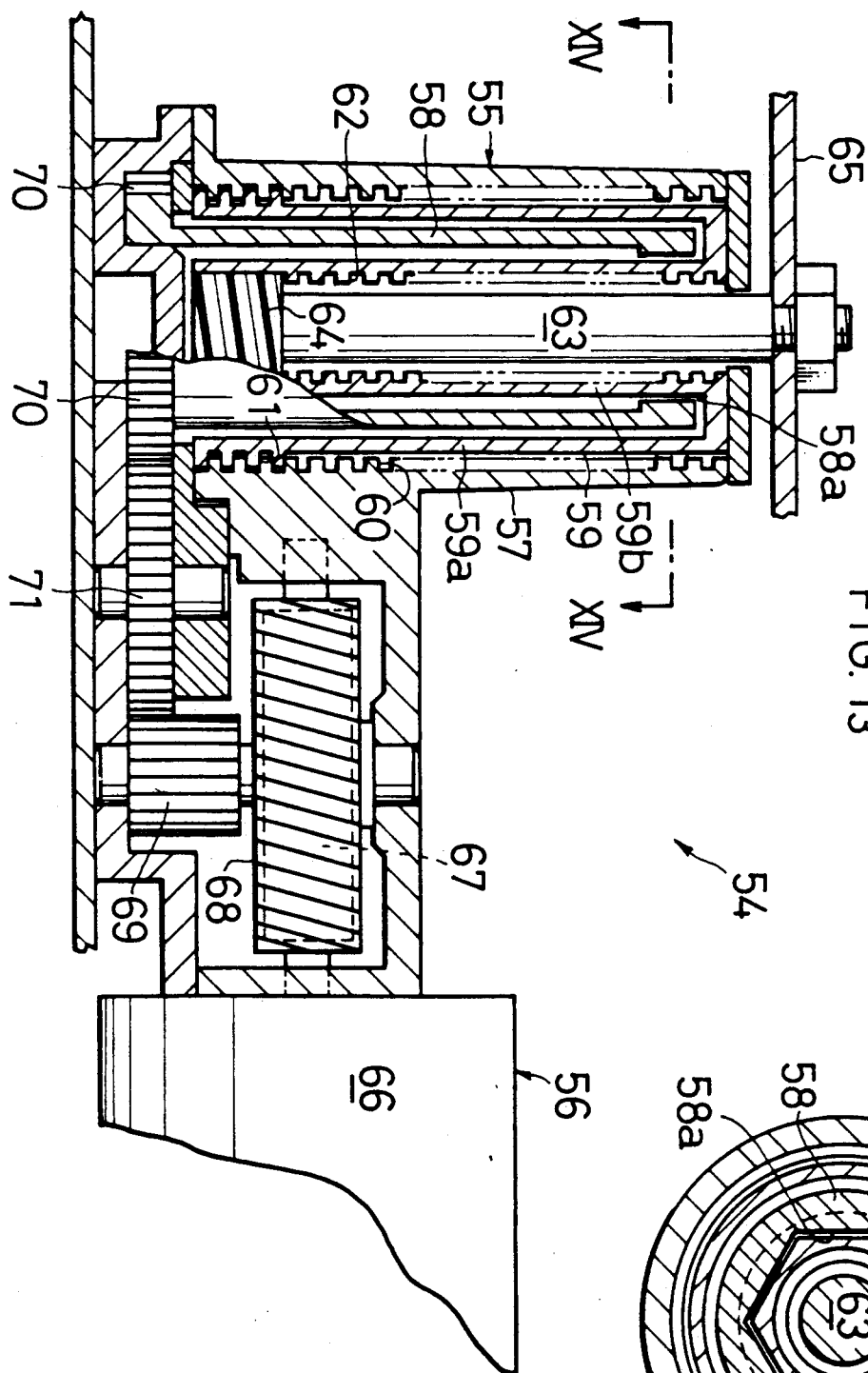
FIG. 13 is a sectional view showing a tilting-up unit in the roof opening/closing apparatus.

FIG. 13 shows tilting-up unit 54 in detail. As shown, it includes light mechanism 55 and drive mechanism 56 therefore. Lift mechanism 55 includes satisfactory cylindrical housing 57, cylindrical driver 58 rotatably supported in and spaced apart from housing 57 and rotor 59 having a double-wall structure and rotated by driver 58. Motor 59 has its outer wall 59a disposed between housing 57 and driver 58 and its inner wall 59b disposed on the inner side of driver 58.

Figure 14:
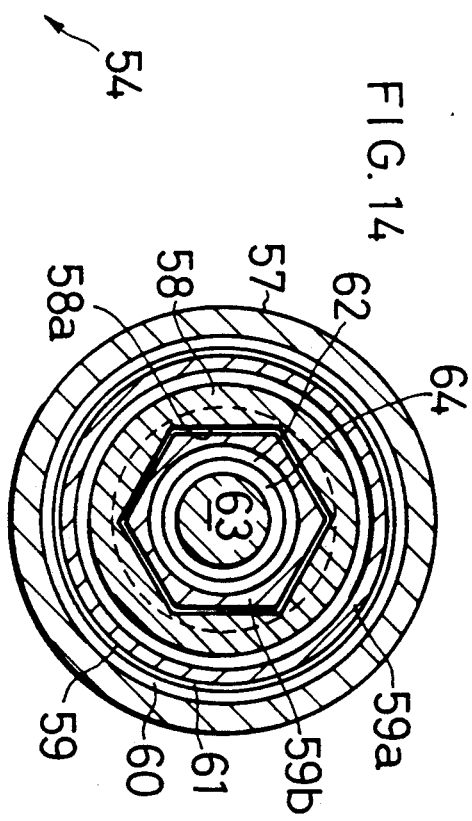
FIG. 14 is a sectional view taken along line XIV—XIV in FIG. 13.

The inner periphery of housing 7 is formed with female screw 60. On the other hand, a lower end portion of the outer periphery of outer wall 59a of rotor 59 is formed with male screw 61 meshing with female screw 60. Further, as shown in FIG. 14, the outer periphery of inner wall 59b of rotor 59 has a hexagonal sectional profile and is adapted to be engaged by hexagonal top opening 58a of driver 58. When driver 58 is rotated, rotor 59 is also rotated to be raised or lowered with the mesh between threads 60 and 61.

The inner periphery of inner wall 59b of rotor 59 is formed with female thread 62. Meshing with female thread 62 is male thread 64 formed in a lower end portion of lift shaft 63. Lift shaft 63 is provided in the central bore of rotor 59, and its top is provided with a connecting plate 65 connecting opposite side tilting-up units 54 to prevent its rotation. When rotor 59 is rotated, therefore, lift shaft 63 is moved upwards and downwards with respect to rotor 59. Connecting plate 65 supports the lower surface of rear end of roof 3.

Drive mechanism 56 has motor 66 having an output shaft provided with worm gear 67 in mesh with worm wheel 68. Worm wheel 68 is provided with integral drive gear 69. The outer periphery of a lower portion of driver 58 of lift mechanism 55 is provided with integral driven gear 70. Drive and driven gears 69 and 70 are coupled to each other via intermediate gear 71.

Figure 12:
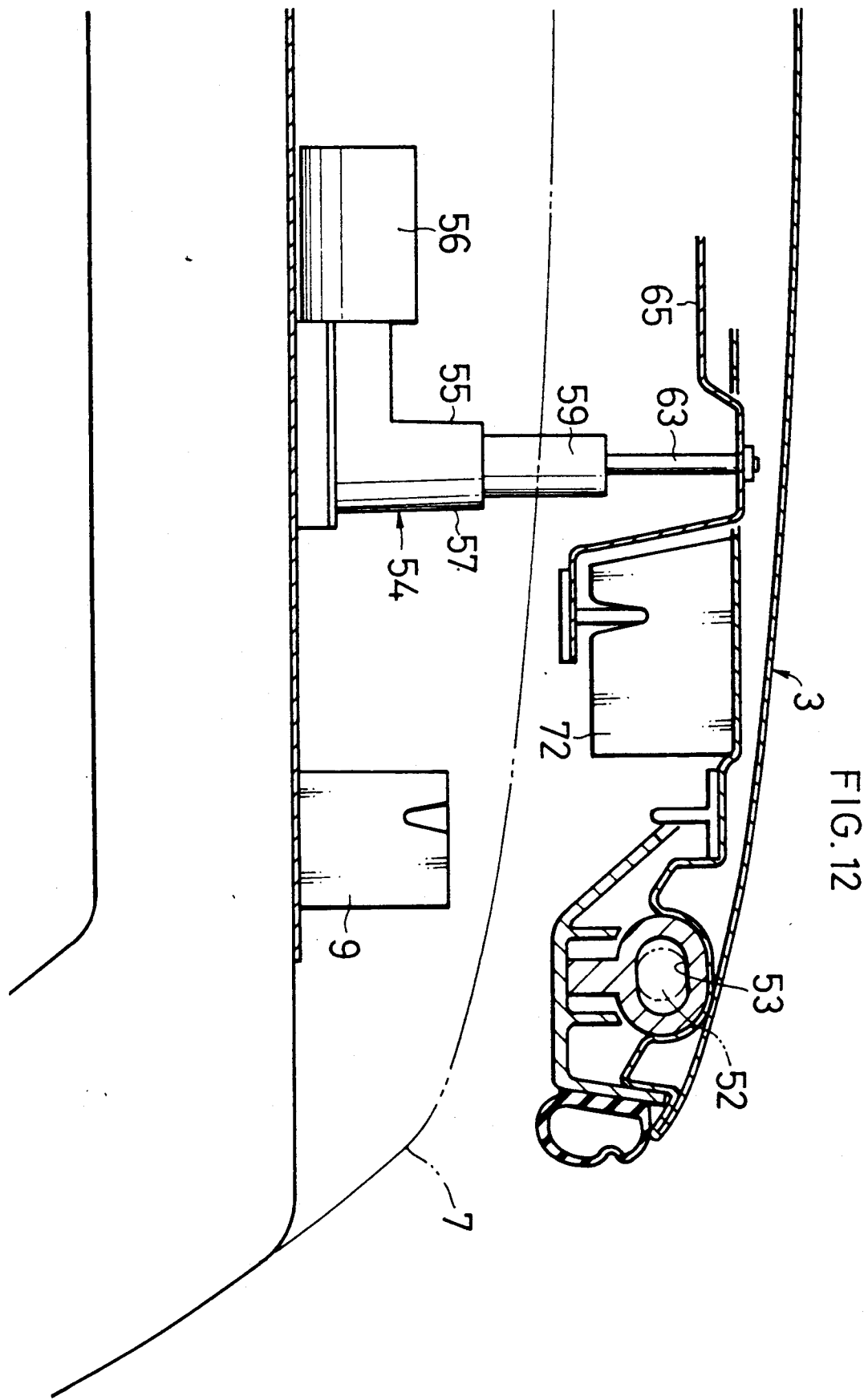
FIG. 12 is a view similar to FIG. 11 showing a state when the roof is fully raised.

Thus, rotation of motor 66 is transmitted after speed reduction to driven gear 70 to rotate driver 58 of lift mechanism 55. With rotation of driver 58 rotor 59 and lift shaft 63 of lift mechanism 55 are raised or lowered to raise or lower the rear end of roof 3. When roof 3 is fully raised, as shown in FIG. 12, engagement bores 53 open to its rear end surface are found above the top surface of roll bar 7 and exposed rearwardly.

Between roof 3 and tilting-up unit 54 is provided motor-driven tilt lock unit 72 for locking the rear end of roof 3 when it is pushed up.

Figure 15:
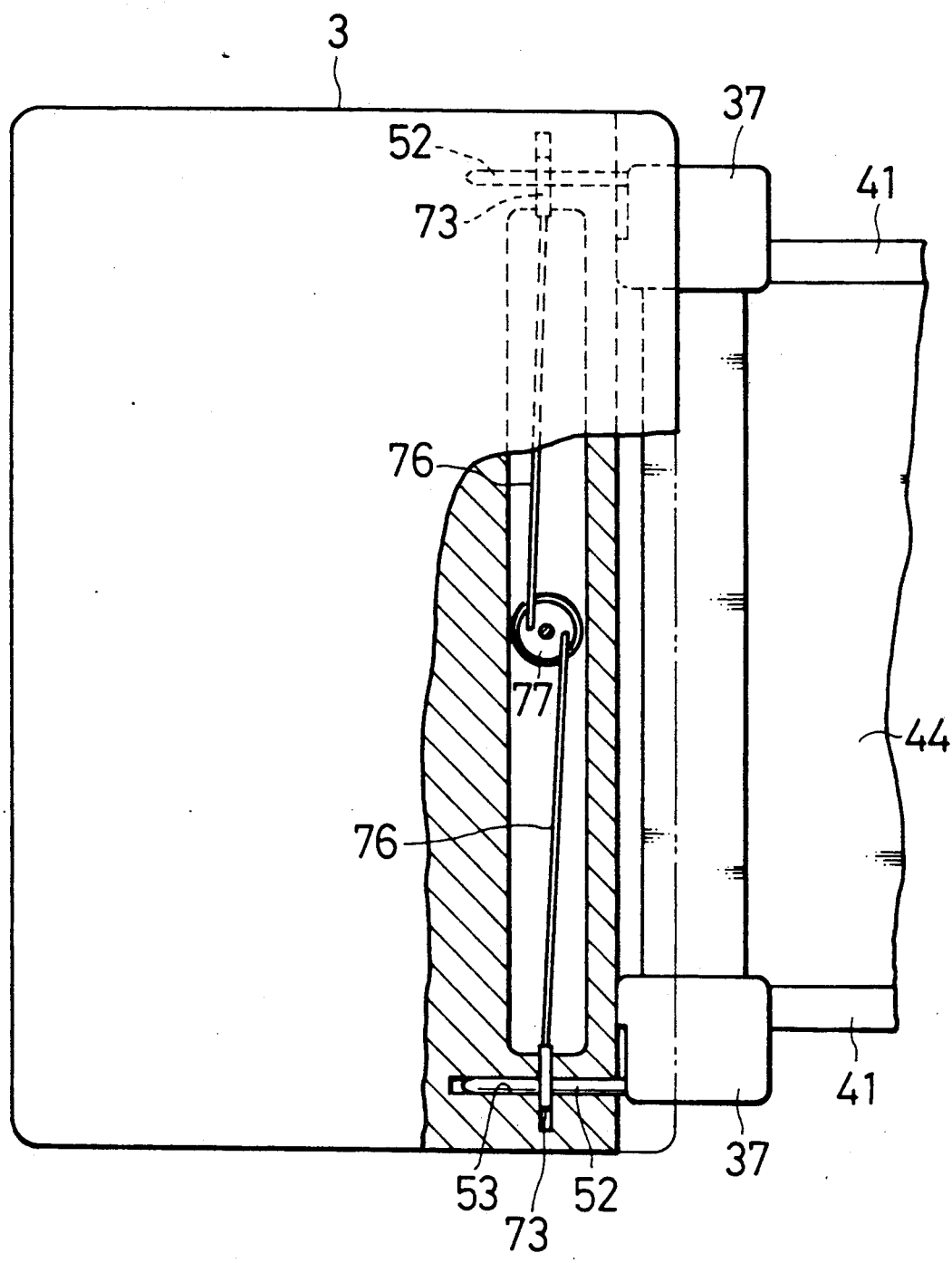
FIG. 15 is a plan view, partly broken away, showing the rear end of the roof when the roof drive pins are coupled thereto.
Figure 16:
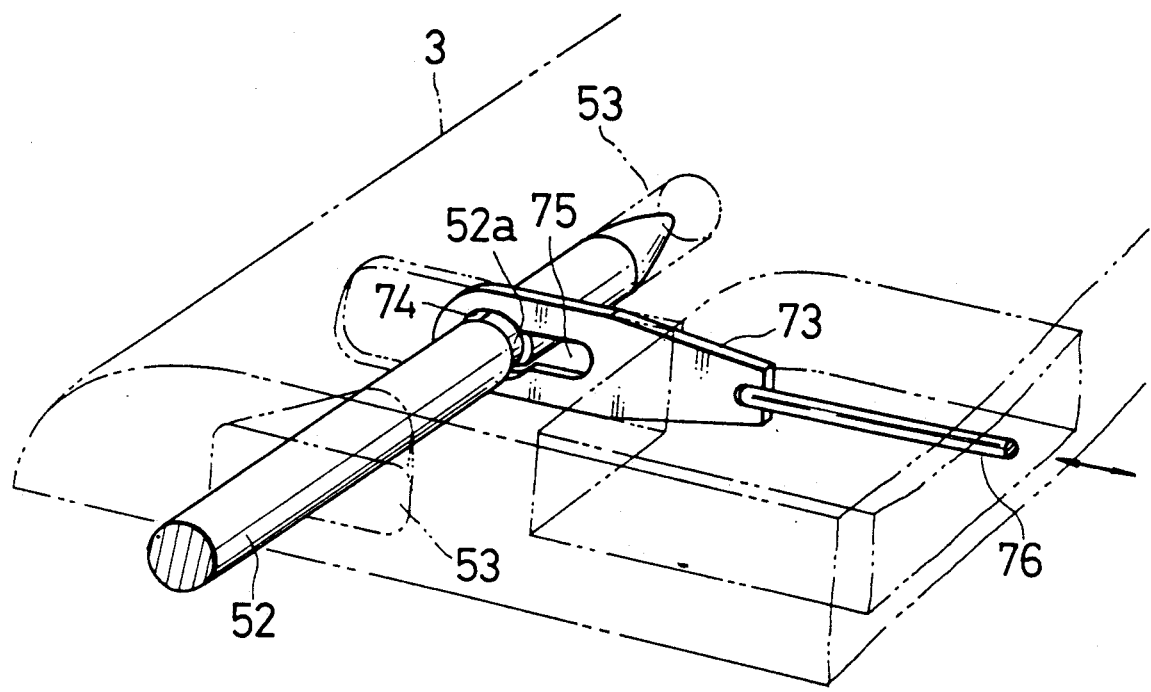
FIG. 16 is a perspective view showing a locking unit for locking the roof drive pins to the roof.

As shown in FIGS. 15 and 16, the rear end of roof 3 is provided with transversally movable locking members 73 extending across engagement bores 53. Each locking member 73 has large diameter hole 74, which is penetrated by roof drive pin 52, and small diameter hole 75 extending from hole 74. Roof drive pin 52, on the other hand, has intermediate small diameter portion 52a capable of being engaged in small diameter hole 75 of locking member 73. Thus, when large diameter hole 74 of locking member 73 is aligned to engagement bore 53, roof drive pin 52 can be advanced and retreated. When small diameter hole 5 is aligned to bore 53, pin 52 is engaged in hole 75 and can neither be advanced nor retreated.

Figure 17:
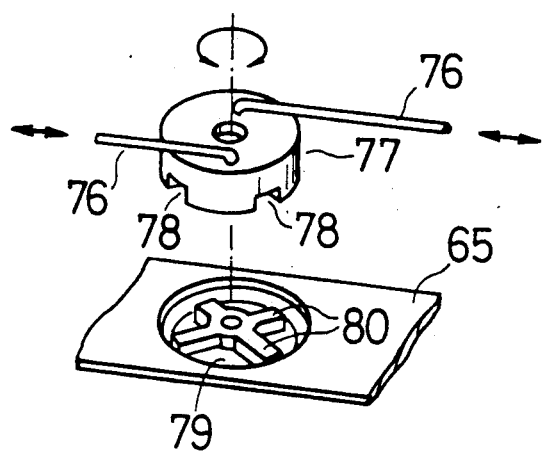
FIG. 17 is a perspective view showing a drive unit for driving the locking unit.

Opposite side locking members 73 are coupled by rods 76 to central rotary member 77 and movable transversally with rotation of rotary member 77. The lower end of rotary member 77 projects slightly downwardly from the lower surface of roof 3. As shown in FIG. 17, the lower end surface of rotary member 77 is formed with engagement grooves 78. On the other hand, connecting plate 65 of tilting-up unit 54 supporting roof 3 is provided at a position facing rotary member 77 when roof is in the closing position with motor-driven roof lock drive unit 79. The upper end of drive unit 79 is provided with engagement projection 80 engaging with engagement grooves 78 formed in the lower end surface of rotary member 77.

When roof 3 is supported by tilting-up unit 54, rotary member 77 or roof 3 is rotated from the side of car body 4 by roof lock drive unit 79, causing transversal movement of locking members 73. When roof drive pins 52 are engaged in engagement bores 53, roof 3 and roof drive pins 52 can be brought to a locked or unlocked relation to one another with a transversal movement of locking members 73. It will be understood that locking members 73 and drive mechanism therefore constitute a motor-driven roof lock unit for causing engagement and disengagement of roof 3 and roof slide unit 36.

Figure 18:
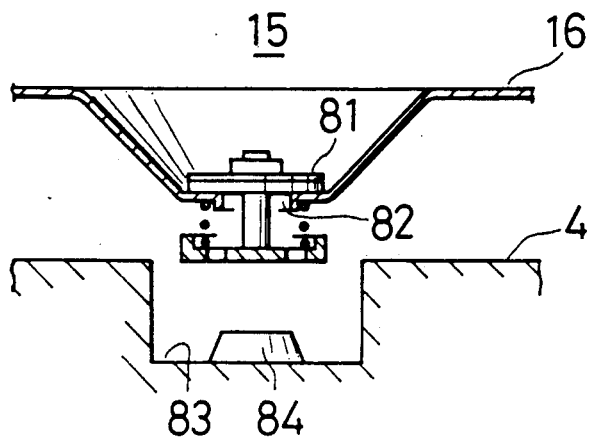
FIG. 18 is a sectional view showing a draining unit of the trunk lid.

As clearly shown in FIGS. 2 and 18, trunk lid frame 16 forming the bottom of roof accommodation space 15 of trunk lid 12 is provided at each rear end corner with drain port 82, which is opened and closed by valve 81. Drain ports 82 are located above drain channel 83 provided in car body 4. When trunk lid 12 is in its position closing the trunk room 13, drain port 82 is opened with engagement of valve 81 with projection 84 provided on drain channel 83.

As shown in FIG. 10, the lower surface of a front end portion of roof 3 is provided with a rearwardly extending engagement notch 85. On the other hand, as shown in FIG. 3, the front end of each first guide rail 41 is provided with forwardly projecting engagement portion 86. When roof 3 is retreated and completely accommodated in roof accommodation space 15 of trunk lid 12, as shown by phantom lines in FIG. 3, engagement notch 85 and engagement portion 86 are engaged with each other to hold the front end of roof 3 locked.

Now, the procedure of opening and closing roof with the apparatus for opening and closing the roof having the above construction will now be described.

Figure 19A:
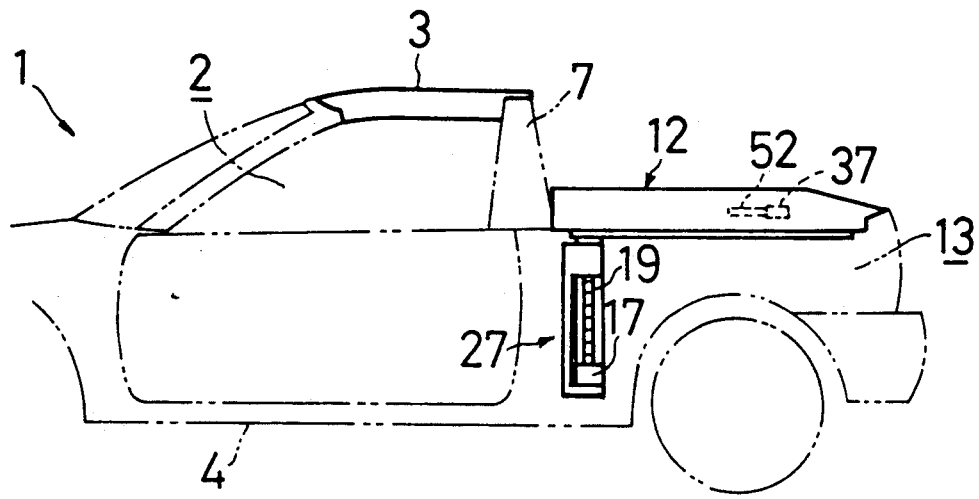
FIGS. 19A to 19F are views for explaining the procedure of opening the roof with the roof opening/closing apparatus.

Normally, roof 3 is secured to car body 4 and at a position to close the top of car room 2, as shown in FIG. 19A. In this state, trunk lid 12 is also at the fully lowered position and closing trunk room 13.

For opening roof 3, active lock unit 35 locking trunk lid 12 is unlocked. Then, motor 25 of trunk lid drive unit 27 is operated. When motor 25 is turned forwardly, its rotation is transmitted through drive and driven gears 26 and 24 to synchronous shaft 23 to simultaneously rotate opposite side feed screws 19 forwardly. At this time, solenoid 32 for causing swinging of ratchet 29 is held by return spring 31 in mesh with ratchet wheel 28. Since the teeth of ratchet wheel 28 have a shape such that they are not meshed with ratchet 29 in the direction of rotation, they have no influence on the operation at this time.

With forward rotation of opposite side feed screws 19, nut members 17 of trunk lid 12 in mesh with feed screws 19 are pushed up. Thus, trunk lid 12 is raised while it is held in its horizontal state.

Figure 19B:
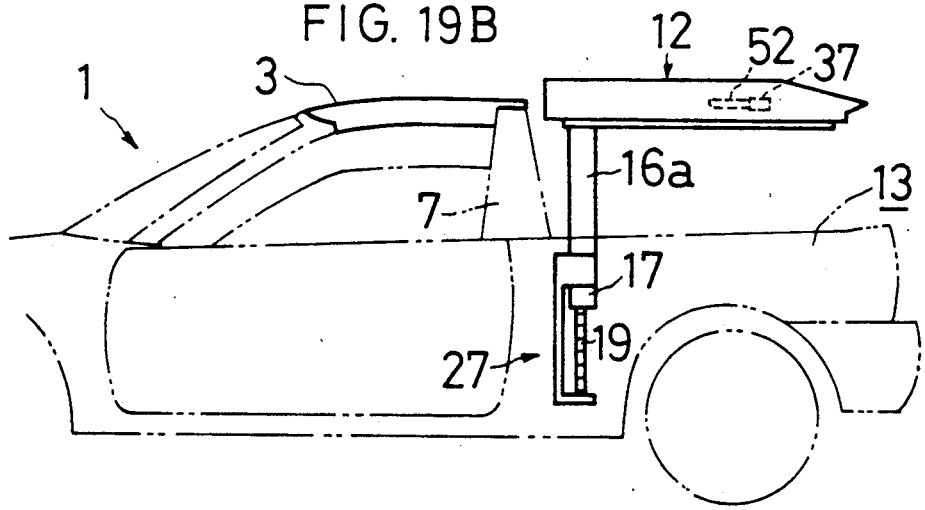
Figure 19C:
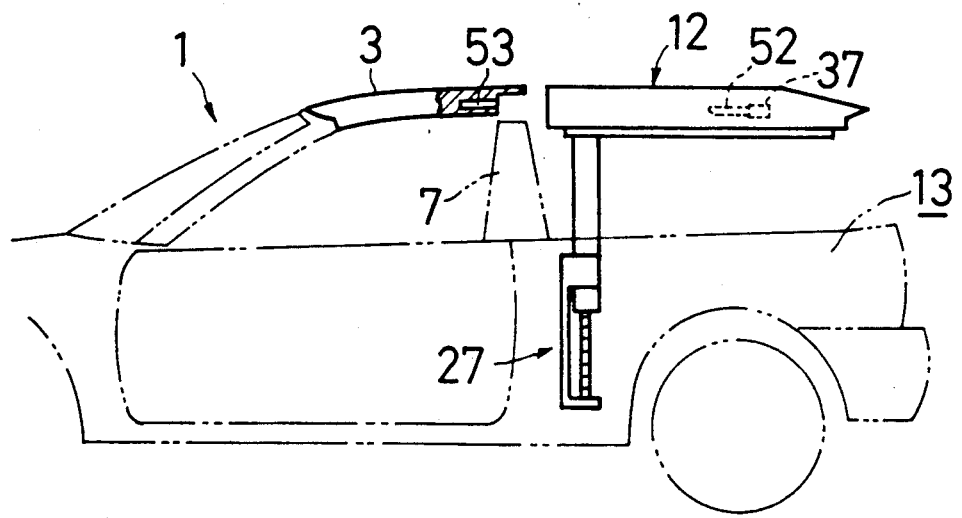

When trunk lid 12 is fully raised, as shown in FIG. 19B, it is slightly higher in level than roll bar 7. At this time, motor 25 is stopped.

In this state, active lock unit 9 securing the rear end of roof 3 to roll bar 7 is unlocked. Then, tilting up unit 54 is operated.

When motor 66 of tilting-up unit 54 is driven forwardly, driver 58 is rotated forwardly. Since the upper end of driver 58 is in engagement with the outer periphery of hexagonal inner wall 59b of rotor 59, with rotation of driver 58 rotor 59 is rotated in the same direction. Further, since male thread 61 provided on lower end portion of rotor 59 is in engagement with female screw 60 provided on the inner periphery of stationary housing 57, with the rotation rotor 59 is raised with respect to housing 57. Further, since female thread 62 provided on the inner periphery of rotor 59 is in mesh with male thread 64 provided on lower end portion of lift shaft 63 and the rotation thereof is restricted, with rotation of rotor 59 lift shaft 63 is raised with respect to rotor 59. Lift shaft 63 thus is raised with respect to housing 57 at a speed corresponding to the sum of the raising speed of rotor 59 and raising speed of lift shaft 63 is relative to rotor 59.

Lift shaft 63 thus is raised greatly in a short period of time and projects from the top of roll bar 7. Thus, roof 3 is pushed up at the rear end and is brought to a state that engagement bores 53 at the rear end are at a position above roll bar 7 and rearwardly exposed.

Then, cable drive unit 47 of roof slide unit 36 is operated. When the motor of drive unit 47 is driven forwardly, gear 47a is rotated in the clockwise direction in FIG. 8. Thus, first and second cables 48 and 49 on the right side (i.e., upper side in FIG. 6) are pulled to the left side, while left side first and second cables 48 and 49 are pulled to the right side. When first cables 48 are pulled, sliders 37 coupled to the rear ends of the cables are moved forwardly along first guide rails 41. Further, since front ends of second cables 49 are secured to trunk lid frame 16, as second cables 49 are pulled, a forward force is applied to connection plate 44 with cable drive unit 47 provided thereon, thus causing forward movement of first guide rails 41 along second guide rails 43.

Thus, sliders 37 are advanced along first guide rails 41. Thus, the distance covered by and speed of sliders 37 are both increased. When first guide rails 41 are moved to the fully advanced position, sliders 37 reach the front ends of first guide rails 41. At this time, first guide rails 41 greatly project forwardly from trunk lid 12, and their front end reach a position above roll bar 7. Thus, roof drive pins 52 provided on sliders 37 are engaged with the rear end of roof 3. FIG. 9 shows the state at this time.

During this time, second guide rails 43, along which support rollers 42 on the rear end of first guide rails 41 roll, are tilted to a state with its front end directed upwards, first guide rails 41 are inclined forwardly downwardly with forward movement of first guide rails 41. When rear portion support rollers 42 reach the downwardly inclined front ends of second guide rails 43, intermediate portions of first guide rails 41 come to be supported by front portion support rollers 46, and subsequently first guide rails 41 advance while their inclined state is maintained. Meanwhile, roof 3 is held in an inclined state corresponding to the inclination of first guide rails 41 by tilting-up units 54. Thus, sliders 37 are advanced along first guide rails 41, and roof drive pins 52 are engaged in engagement bores 53 at the rear end of roof 3.

Figure 19D:
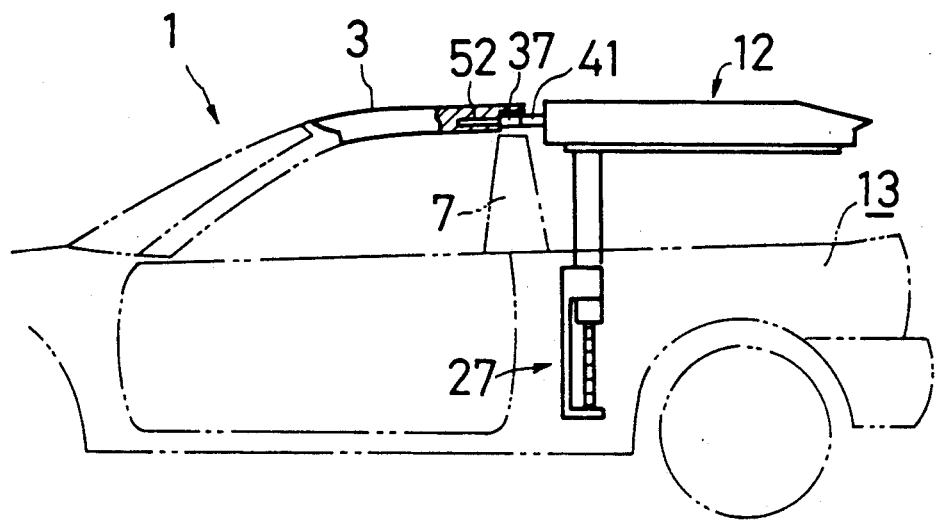

At this time, large diameter holes 74 in locking members 73 of the roof lock unit cross engagement bores 53. Thus, roof drive pins 52 penetrate locking members 73. When roof drive pins 52 are completely inserted in engagement bores 53, small diameter holes 52a are brought to position to face locking members 73. At this time, rotary members 77 of roof 3 is rotated to bring small diameter holes 75 of locking members 73 into engagement with small diameter portions 52a of roof drive pins 52. In this way, roof 3 is coupled to roof drive pins 52. FIG. 19D shows this state.

Then, tilt lock unit 72 for locking the rear end of roof 3 to tilting-up units 54 is unlocked, and motor 66 of tilting-up unit 54 is driven reversely to lower lift shaft 63. Further, active lock unit 8 securing the front end of roof 3 to front cross member 6 is unlocked. Then, sliders 37 and first guide rails 42 are retreated by operating roof slide unit 36. As a result, roof 3 coupled to roof drive pins 52 is retreated together with sliders 37 and separated from car body 4.

At this time, roof 3 is supported like a cantilever by first guide rails 41 via roof drive pins 52. However, since first guide rails 41 are supported at two points by rear and front portion support rollers 42 and 46, its support rigidity is high. Therefore, roof 3 is supported in a stable state although first guide rails 41 project greatly from trunk lid 12.

Figure 19E:
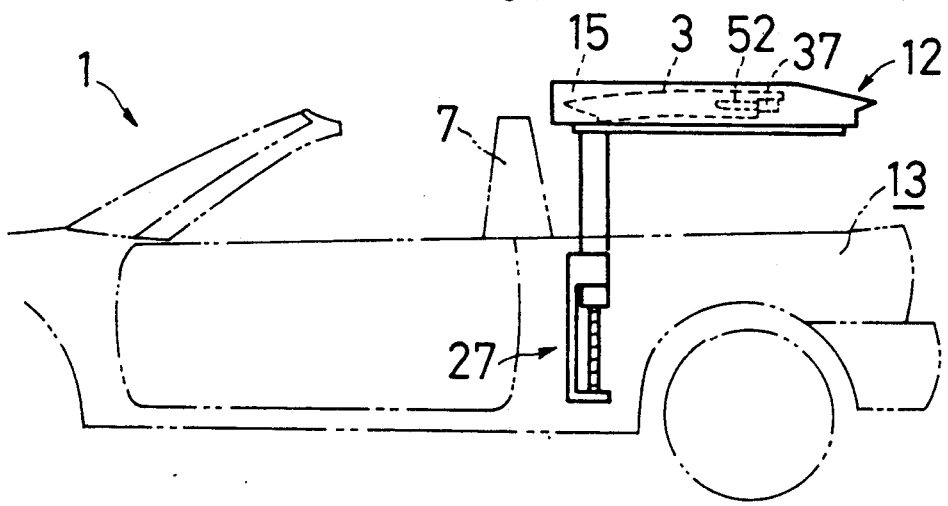

Thus, roof 3 is retreated to be accommodated in roof accommodation space 13 in trunk lid 12, as shown in FIG. 19E. This state is shown phantom lines in FIG. 3. When first guide rails 41 are fully retreated, their front ends are supported by intermediate support rollers 45, while their rear ends are supported by rear portion support rollers 42. Thus, first guide rails 41 become horizontal, and roof 3 is supported in a stable state. Further, at this time engagement notches 85 provided in the lower surface of the front end portion of roof 3 are automatically engaged with engagement portions 86 provided on the front ends of first guide rails 41. Thus, the front end of roof 3 is supported to eliminate rattling thereof.

In the above way, roof 3 is accommodated in roof accommodation space 15 in trunk lid 12 and supported by roof slide unit 36, i.e., trunk lid 12.

During this time, i.e., with movement of roof 3 from the side of car body 4 to the side of trunk lid 12, the load or roof 3 is applied to trunk lid 12. Thus, a force tending to lower trunk lid 12 is applied to trunk lid drive unit 27, tending to cause rotation of synchronous shaft 23 in the clockwise direction in FIG. 5. However, the rotation is prevented by the mesh between teeth of ratchet wheel 28 and ratchet 29. This has an effect of reliably preventing the lowering of trunk lid 12 during movement of roof 3.

Figure 19F:
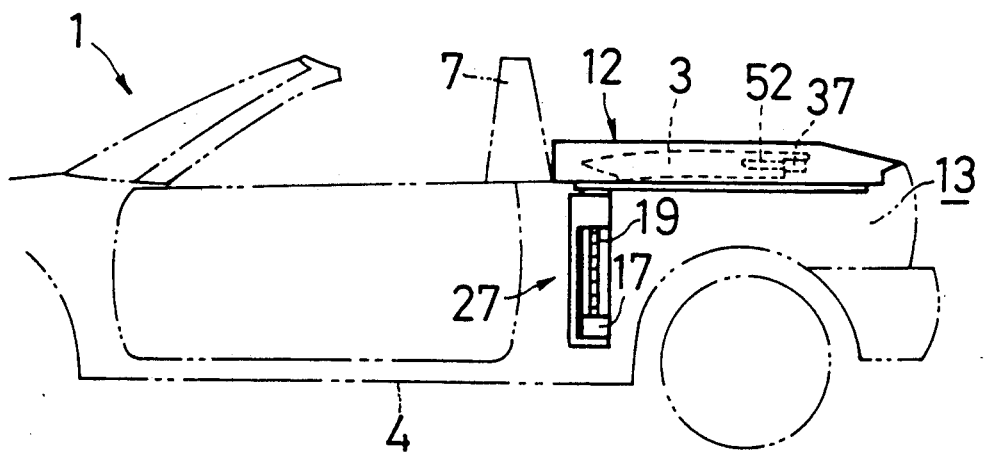

When roof 3 is particularly supported by trunk lid 12, solenoid 32 provided on trunk lid drive unit 27 is excited to pull rod 33 into solenoid 32. As a result, ratchet 29 is separated from ratchet wheel 28 to become couple of being rotated in either direction. At this time, motor 25 of trunk lid driver unit 27 is driven reversely to lower trunk lid 23 with roof 3 accommodated therein. When trunk lid 12 reaches the position to close the trunk room 13 as shown in FIG. 19F, motor 25 is stopped, and active lock unit 35 is operated to secure trunk lid 12 to car body 4.

In this way, the operation of opening roof 3 is completed. In this state, roof 3 is completely accommodated in trunk lid 12, thus providing a very satisfactory appearance.

During this time, door glasses 10a and rear window glass 11 are opened, thus providing a sense of being widely opened.

For closing roof 3, an entirely reverse procedure to the case of opening is taken.

As shown above, with this apparatus roof 3 is opened and closed by sequentially causing vertical movement of trunk lid, 12, i.e., roof slide unit 36, tilting-up of roof 3 and longitudinal movement of roof drive unit 52. Thus, it is possible to obtain perfect automation of the opening and closing of roof 3 by constructing trunk lid drive unit 27, tilting-up unit 54 and roof slide unit 36 such that they are of motor-driven type.

To this end, a sequence circuit may be assembled, which provides sequential operation signals according to operation of a roof opening/closing switch, for instance. In this case, the opening and closing of roof 3 are permitted to be started when and only when car 1 is parked. For example, it is arranged such that next operation is not started when the roof opening/closing switch is operated unless a shift lever is in P range and a side brake is pulled in case of an auto-transmission car and unless a side brake is pulled and a car speed sensor is indicating zero in case of a manual transmission car. Further, it is arranged such that car 1 is started by a mistake during operation of the roof opening/closing unit, an alarm sound is generated, and if this occurs before releasing of active lock unit 8 for locking the front end of roof 3 the initial state is restored, while if this occurs after the releasing of active lock unit 8 further operation of opening or closing is continued.

Further, with this apparatus roof 3 is opened and closed with tilting-up and movement in longitudinal direction and ascent and descent of trunk lid 12. Therefore, when opening and closing roof 3, the orbit of its movement does not greatly get out car body 4 sidewise or upwardly. Therefore, it is possible to pen and close roof 3 even in a narrow garage.

Further, since the feed screw mechanism is provided in vertical direction in trunk lid driver unit 27, nut members 17 provided on support legs 16a of trunk lid 12 are urged downwardly at all time by the gravity of trunk lid 12. Thus, rattling of trunk lid 12 in vertical direction when the trunk lid is raised or lowered is prevented. More particularly, trunk lid 12 is raised and lowered to an accurate extent in correspondence to the rotation number of feed screw 19. As a result, without use of a particular sensor or like rod drive pins 52 can be positioned accurately and inserted reliably into engagement bores 53 of roof 3.

In case when trunk lid 12 rattles transversely, guide rails or guide shafts for guiding trunk lid 12 at the time of the ascent or descent may be provided in addition to the feed screw mechanism.

Further, when roof 3 is supported by roof drive pins 52 with projection of first guide rails 41 of roof slide unit 36, a forward rotational moment is exerted to feed screws 19 supporting trunk lid 12. Further, when roof 3 is accommodated in trunk lid 12, a rearward rotational moment is exerted to feed screws 19. For this reason, trunk lid 12 is liable to rattle in longitudinal directions. In such case, a damper or the like may be provided between the rear end of trunk lid 12 and car body 4.

Further, with feed screws 19 provided on front portions of trunk room 13, trunk lid drive unit 27 is protected even when the rear portion of car body 4 is deformed by collisions or the like. Further, there if no possibility that drive unit 27 interferes with loading and unloading of cargo with respect to trunk room 13.

Further, with the stopper consisting of ratchet wheel 28 and ratchet 29 provided on trunk lid drive unit 27, it is possible to reliably prevent lowering of trunk lid 12 during forward or backward movement of roof 3. Thus, spur gears such as gears 24 and 26 can be used for the speed reduction mechanism of drive unit 27 and the speed reduction ratio can be set to an adequate value. It is thus possible to raise and lower roof 3 more quickly.

In case when it becomes that trunk lid 12 at the raised position fails to be moved by motor due to battery voltage reduction, wire 34 coupled to rod 33 of ratchet 29 is pulled. By so doing, ratchet 29 swings against return spring 31 and is separated from ratchet wheel 28. Then, by holding this state synchronous shaft 23 is manually rotated in the clockwise direction shown in FIG. 5. Since the speed reduction ratio of the speed reduction mechanism of trunk lid drive unit 27 is set to be smaller, it is readily possible to manually turn the synchronous shaft 23. By turning synchronous shaft 23 in this way, trunk lid 12 is lowered.

In this way, with this apparatus it is possible to raise and lower trunk lid 12 manually. Thus, in the event of stop of the motor system due to some cause while roof 3 is opened or closed, the operation can be continued.

When opening roof 3 with raindrops or like attached thereto, water is collected in roof accommodation space 15 of trunk lid 12. However, when trunk lid 12 is lowered down to the position to close the trunk room 13, valve 81 is brought into contact with projection 84 provided on the side of car body 4 to open drain port 82. Therefore, water in roof accommodation space 15 flows from drain port 82 to drain channel 83 of car body 4 to be drained through drain channel 83 to the outside of the car.

Further, with this apparatus roof 3 is tilted up as noted before. Therefore, although the rear end of roof 3 is not found above the top of roll bar 7 in the closed state of roof 3, when opening and closing roof 3 engagement bores 53 at the rear end of roof 3 can be exposed rearwardly by raising the rear end to be above roll bar 7. In the closed position of roof 3, engagement bores 53 are concealed from the rear by roll bar 7. Therefore, while providing satisfactory appearance, when opening or closing roof 3 drive pins 52 may be engaged with or disengaged from roof 3 by merely causing advancement or retreat of roof drive pins 52.

Further, by causing movement of roof 3 in longitudinal direction in the inclined state as noted above, the seal provided between roof 3 and car body 4 is not rubbed, and damage to the seal can be prevented. Besides, since the upper and lower surfaces are constituted by the seal surface of the seal, the seal property can be improved.

In this way, damage to the seal provided between roof 3 and door glass 10a can also be reduced. To make this reliable, it is desirably that door glass 10a is automatically lowered prior to an operation of opening or closing roof 3.

Figure 20:
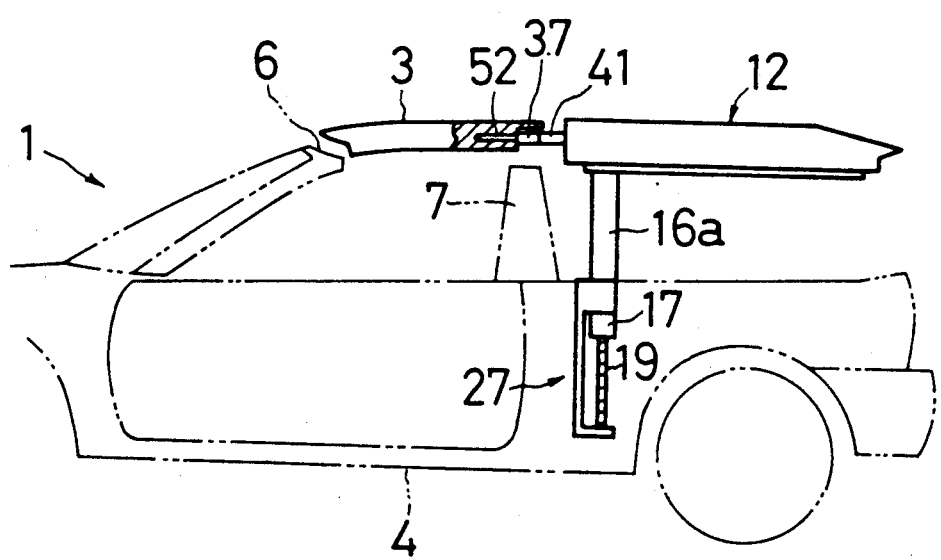
FIG. 20 is a schematic side view showing a different embodiment of the roof opening/closing apparatus according to the invention.

Further, for protecting such seal the vertical stroke of trunk lid driven unit 27 may be slightly increased, so that after roof drive pins 52 are engaged in roof 3 as shown in FIG. 19D trunk lid 12 may be further be raised completely from car body 4 as shown in FIG. 20 before moving roof 3 rearwardly.

Further, construction of two-step slide type guides 38 consisting of first and second guide rails 41 and 43 for guiding movement of roof drive pins 52 in longitudinal direction permits great projection of roof drive pins 52 from trunk lid 12 even if individual guide rails 41 and 43 have small lengths. Thus, it is possible to cause engagement of roof drive pins 32 in roof 3 even in such case where trunk lid 12 is greatly spaced apart rearwardly from roof 3 in its raised position. Thus, interference with roll bar 7 can be reliably prevented when trunk lid 12 is raised and lowered. Further, normally guide rails 41 and 43 having small lengths can be completely accommodated in trunk lid 12.

When closing roof 3, positional deviation is liable to be produced particularly of the front end of roof 3. However, slight positional deviation can be made up for by active lock unit 8. Further, more accurate positioning can be obtained by providing guide pins on the lower surface of the front end of roof 3 and permitting engagement of the guide pins in guide bores or holes provided in front cross member 6.

Further, since trunk lid 12 can be raised and lowered in its horizontal state to open and close trunk room 13, it is possible to provide seal between trunk lid 12 and car body 4 over the entire periphery. Besides, the seal surfaces are upper and lower surfaces. It is thus possible to provide reliable seal.

Trunk lid 12 is adapted to be opened and closed alone in other cases than the operation of opening or closing roof 3. For example, active lock unit 35 and trunk lid drive unit 27 are adapted to be operated by a key operation from the rear side of the car body or by operation of a trunk lid opening/closing switch provided in a driver's seat. In this way, trunk lid 12 can be opened and closed independently of the opening and closing of roof 3 for loading and unloading of cargo in and out of trunk room 13. In case where the height of raised trunk lid 12 is too small to easily load and unload large cargo, an opening for loading an unloading cargo may be secured by such means as permitting a lower portion of the rear end wall of trunk room 13 to be opened.

In case when it is desired to prevent exposure of the inner cargo in trunk room 13 with opening thereof at the time of opening and closing the roof, the top of trunk room 13 may be covered with a separator plate or the like.

FIGS 21 and 22 show other embodiments of the apparatus for opening and closing roof according to the invention. These embodiment are different from the previous embodiment only in the trunk lid drive unit, the remainder being the same.

In the embodiment shown in FIG. 21, trunk lid driver unit 87 consists of an X-link mechanism. Links 88 which are assembled in the from of figure X have their upper ends slidably received in longitudinal guide grooves 89 provided in trunk lid 12. Their lower ends are coupled to screw members 90a having opposite threads provided on longitudinal drive shaft 90.

With this trunk lid driver unit 87, by rotating drive shaft 90 in one direction, the lower ends of links 88 in the X-link assembly are brought toward or away from each other. Thus, the inclination of links 88 are changed, and trunk lid 12 is raised and lowered while it is held substantially in a horizontal state.

In the embodiment shown in FIG. 22, trunk lid driver unit 91 uses rotary lever 92. Rotary lever 92 has its free end slidably received in longitudinal guide grooves 93 provided in trunk lid 12. Its stem is rotatably supported on car body 4 for being rotated from motor 94 via cable 95 and gear box 96. The front end of trunk lid 12 is supported such that it is movable along a vertical guide (not shown) provided along roll bar 7 of car body 4.

Again with such trunk lid driver unit 91, trunk lid 12 is raised and lowered with rotation of rotary lever 92. Further, trunk lid 12 has its front end supported by guide rails on the side of car body 4, and therefore it is held horizontal when it is raised and lowered.

Thus, whether trunk lid driver unit 87 and 91 in the embodiments of FIGS. 21 and 22 used, roof 3 again may be opened and closed in procedures like those in the case of FIGS. 19A and 19F.

In this embodiment, telescopically extensible lift mechanism 55 is used for tilting-up unit 54 for pushing up the rear end of roof 3. However, it is possible to use a link type or cam type mechanism as well.

Further, while the above embodiments used a ratchet mechanism for motor-driven stopper of trunk lid driver unit 27, it is possible to use an electromagnetic brake or the like as well, which locks drive unit 27 only when roof 3 is being moved.

Further, instead of rollers 42, 45 and 46 in the above embodiments, stationary support members made of a resin and having a small coefficient of friction may be used as support members for supported first guide rails 41.

Further, while in the above embodiments roof accommodation space for accommodating roof 3 therein is provided inside trunk lid 12, it is possible to roof slide unit 36 on trunk lid panel 14 and to let roof 3 be supported on trunk lid 12.

What is claimed is:

1. An apparatus for opening and closing the roof of an open roof car with said roof capable of being mounted on and dismounted from a car body, comprising:
   a trunk lid driver unit for raising and lowering a trunk lid for opening and closing a trunk room while holding said trunk lid substantially horizontal; and
   a roof slide unit provided on said trunk lid for causing movement of said roof in longitudinal directions;
   said trunk lid being raised up to a position behind said roof with said roof in a closed position by said trunk lid driver unit, and then said roof being moved in a longitudinal direction by said roof slide unit.

2. The apparatus according to claim 1, wherein:
   when said roof is in its closed position, its front end is supported by a front cross member provided between the upper ends of front pillars and its rear end supported by a roll bar.
and which further comprises a roof lift unit for raising at least the rear end of said roof from the closed position thereof.

3. The apparatus according to claim 1, wherein:
said trunk lid has an inner roof accommodation space, said roof being capable of being accommodated in said roof accommodation space when moved rearwardly.

4. The apparatus according to claim 3, wherein:
a bottom of said roof accommodation space is provided with a drain port having value means opened upon engagement with a drain channel portion of the car body when said trunk lid is in its position to close said trunk room.

5. The apparatus according to claim 1, wherein:
said trunk lid driver unit includes a feed screw provided on the car body and extending vertically, a nut provided on a trunk lid support leg and in mesh with said feed screw, said feed screw and nut constituting a feed screw mechanism, and a motor-driven drive unit for driving said feed screw mechanism.

6. The apparatus according to claim 5, wherein:
said feed screw is provided on a front portion of said trunk room.

7. The apparatus according to claim 1, wherein:
said trunk lid driver unit is provided with a motor-driven stopper capable of holding said driver unit in a stationary state and manual releasing means for manually releasing said stopper.

8. The apparatus according to claim 1, wherein:
said roof slide unit includes a roof drive pin movable in longitudinal directions by a motor-driven drive unit and a guide for guiding longitudinal movement of said roof drive pin;
said roof is provided adjacent to its rear end with an engagement bore; and
said roof is coupled to said roof slide unit by forwardly inserting said roof drive pin into said engagement bore.

9. The apparatus according to claim 8, wherein:
said guide includes a first guide rail for supporting said roof drive pin for movement in longitudinal directions and a second guide rail for supporting said first guide rail for movement in longitudinal directions.

10. The apparatus according to claim 9, wherein:
a rear end portion of said first guide rail is provided with a rear portion support member supported by said second guide rail;
a front end portion of said trunk lid is provided with a front portion support member for supporting said first guide rail at a forward position thereof with said first guide rail is in an advanced position; and
said trunk lid is provided at a position rearwardly of said front portion support member with an intermediate support member for supporting said front end portion when said first guide rail is in a retreated position.

11. The apparatus according to claim 8, wherein:
said engagement bore of said roof is concealed from the rear side by a roll bar supporting the rear end of said roof when said roof is in a closed position; and
said roll bar is provided with a tilting-up means for pushing up the rear end of said roof to expose said engagement bore rearwardly.

12. The apparatus according to claim 8, wherein:
said roof slide unit is provided with an engagement portion for engaging with and holding the front end of said roof when said roof is retreated.

* * * * *